(12) United States Patent
Holenstein

(10) Patent No.: US 11,177,719 B2
(45) Date of Patent: Nov. 16, 2021

(54) ELECTROMAGNETIC ROTARY DRIVE AND ROTATIONAL DEVICE

(71) Applicant: Levitronix GmbH, Zürich (CH)

(72) Inventor: Thomas Holenstein, Umiken (CH)

(73) Assignee: LEVITRONIX GMBH, Zürich (CH)

( * ) Notice: Subject to any disclaimer, the term of this patent is extended or adjusted under 35 U.S.C. 154(b) by 209 days.

(21) Appl. No.: 16/389,369

(22) Filed: Apr. 19, 2019

(65) Prior Publication Data

US 2019/0356195 A1 Nov. 21, 2019

(30) Foreign Application Priority Data

May 18, 2018 (EP) ..................................... 18173277

(51) Int. Cl.
| | |
|---|---|
| *H02K 7/09* | (2006.01) |
| *F04D 13/06* | (2006.01) |
| *F04D 29/048* | (2006.01) |
| *F16C 32/04* | (2006.01) |
| *H02K 3/18* | (2006.01) |
| *H02K 21/16* | (2006.01) |

(52) U.S. Cl.
CPC ............... *H02K 7/09* (2013.01); *F04D 13/06* (2013.01); *F04D 29/048* (2013.01);
(Continued)

(58) Field of Classification Search
CPC .. A61M 1/10; F04D 1/00; F04D 13/06; F04D 29/048; F04D 29/42; F04D 3/02;
(Continued)

(56) References Cited

U.S. PATENT DOCUMENTS

| | | | |
|---|---|---|---|
| 6,100,618 A * | 8/2000 | Schoeb | F04D 29/048 310/90.5 |
| 9,956,332 B2 * | 5/2018 | LaRose | A61M 60/419 |

(Continued)

FOREIGN PATENT DOCUMENTS

| | | |
|---|---|---|
| EP | 0819330 B1 | 6/2001 |
| EP | 0860046 B1 | 2/2003 |

(Continued)

OTHER PUBLICATIONS

Extended European Search Report dated Nov. 7, 2018 in corresponding European Patent Application No. 18173277.7, filed May 18, 2018 (with English Translation of Categories of Cited Documents).

*Primary Examiner* — Tran N Nguyen
*Assistant Examiner* — Leda T Pham
(74) *Attorney, Agent, or Firm* — Global IP Counselors, LLP

(57) ABSTRACT

An electromagnetic rotary drive includes a rotor, a stator and windings. The rotor includes a magnetically effective core. The rotor is contactlessly magnetically drivable about an axis of rotation and the rotor is contactlessly magnetically levitatable. The stator has coil cores, each with a longitudinal limb parallel with the axis and a transverse limb extending radially, the transverse limb being perpendicular to the axis. The windings generate an electromagnetic rotational field, each winding surrounding one longitudinal limb, such that the stator is free of permanent magnets. The rotor is ferromagnetic or ferrimagnetic with one preferential magnetic direction extending radially, and the core of the rotor has a magnetic resistance in the preferential magnetic direction, the magnetic resistance at most half as large as the magnetic resistance in a direction, which is perpendicular to the preferential magnetic direction and perpendicular to the axial direction.

19 Claims, 13 Drawing Sheets

(52) U.S. Cl.
CPC ...... *F16C 32/0459* (2013.01); *F16C 32/0493* (2013.01); *H02K 3/18* (2013.01); *H02K 21/16* (2013.01); *F16C 2360/44* (2013.01)

(58) Field of Classification Search
CPC .......... F04D 5/00; H02K 19/10; H02K 29/00; H02K 7/09; H02K 7/14
See application file for complete search history.

(56) References Cited

U.S. PATENT DOCUMENTS

| | | | |
|---|---|---|---|
| 10,348,172 B2* | 7/2019 | Moura | H02K 3/20 |
| 10,491,061 B2* | 11/2019 | Jassal | H02K 5/00 |
| 2009/0121571 A1 | 5/2009 | Onuma | |
| 2011/0025154 A1* | 2/2011 | Nussbaumer | H02K 7/09 |
| | | | 310/90.5 |
| 2012/0086289 A1* | 4/2012 | Kolehmainen | H02K 1/246 |
| | | | 310/46 |
| 2014/0062239 A1* | 3/2014 | Schoeb | F16C 32/0497 |
| | | | 310/90.5 |
| 2017/0040868 A1* | 2/2017 | Noh | F04D 13/064 |

FOREIGN PATENT DOCUMENTS

| | | |
|---|---|---|
| EP | 2065085 A1 | 6/2009 |
| EP | 2280471 A1 | 2/2011 |
| EP | 3232549 A1 | 10/2017 |
| WO | 2012159966 A1 | 11/2012 |

* cited by examiner

--Prior Art--

ELECTROMAGNETIC ROTARY DRIVE AND ROTATIONAL DEVICE

CROSS-REFERENCE TO RELATED APPLICATION

This application claims priority to European Application No. 18173277.7, filed May 18, 2018, the contents of which are hereby incorporated herein by reference.

FIELD OF THE INVENTION

The invention relates to an electromagnetic rotary drive and to a rotational device

BACKGROUND OF THE INVENTION

Electromagnetic rotary drives are known, which are configured as so-called temple motors. One conventional configuration of a temple motor can be seen in a perspective representation in FIG. 1. To indicate that the representation in FIG. 1 is a conventional device, the reference signs are here respectively provided with an inverted comma or dash. The temple motor is designated as a whole with the reference sign 1'.

The characteristic feature of a temple motor is that the stator 2' has a plurality of coil cores 4', each comprising a bar-shaped longitudinal limb 41', which extends parallel to the axial direction A'. The axial direction A' refers in this respect to that direction which is defined by the desired axis of rotation of the rotor 3', i.e. the axis of rotation about which the rotor 3' rotates in the operating state when it is in a centered and non-tilted position with respect to the stator 2' in the radial plane which is disposed perpendicular to the axial direction. Every bar-shaped longitudinal limb 41' extends from a first end, at the bottom according to the illustration, in the axial direction A' up to a second end, at the top according to the illustration. In the configuration according to FIG. 1, each coil core 4' comprises, in addition to the longitudinal limb 41', a traverse limb 42', which is respectively disposed at the second end of the longitudinal limb 41' and which extends in the radial direction towards inside, i.e. substantially at a right angle to the longitudinal limb 41'. In this configuration, the coil cores 4' each have the shape of an L, wherein the transverse limbs 42' form the short limb of the L. The rotor 3' is then arranged between the transverse limbs 42'. Only the magnetically effective core 31' of the rotor 3', which is configured as a disk-shaped permanent magnet, is shown of the rotor 3' in FIG. 1. The magnetization of the permanent magnet is illustrated by the arrow without a reference sign.

The plurality of bar-shaped longitudinal limbs 41' which extends in the axial direction A' and which are reminiscent of the columns of a temple has given the temple motor its name.

Furthermore, electromagnetic rotary drives are known which are configured and operated according to the principle of the bearingless motor. The term bearingless motor in this respect means an electromagnetic rotary drive in which the rotor is levitated completely magnetically with respect to the stator, wherein no separate magnetic bearings are provided. For this purpose, the stator is configured as a bearing and drive stator, which is both the stator of the electric drive and the stator of the magnetic levitation. A magnetic rotational field can be produced using the electrical windings of the stator, which magnetic rotational field, on the one hand, exerts a torque onto the rotor, which effects its rotation and which, on the other hand, exerts a shear force, which can be set as desired, onto the rotor so that its radial position can be actively controlled or regulated. The absence of a separate magnetic bearing with a complete magnetic levitation of the rotor is the property, which gives the bearingless motor its name.

The bearingless motor has become sufficiently well known to the person skilled in the art in the meantime and is used for a number of different applications. Some fundamental descriptions can be found, for example, in EP-A-0 860 046 and EP-A-0 819 330.

SUMMARY

Due to the absence of mechanical bearings, the bearingless motor is in particular suitable for pumping, mixing or stirring devices, with which very sensitive substances are conveyed, for example blood pumps, or on which very high demands are made with respect to purity, for example in the pharmaceutical industry or in the biotechnological industry, or with which abrasive or aggressive substances are conveyed, which would very quickly destroy mechanical bearings, for example pumps or mixers for slurry in the semiconductor industry. Bearingless motors are also used in semiconductor production for supporting and rotating wafers, for example when they are coated or treated with photoresist or other substances.

A further advantage of the principle of the bearingless motor in pumping, stirring or mixing applications results from the design of the rotor as an integrated rotor, which is both the rotor of the electromagnetic drive and the rotor of the pump, of the stirrer or of the mixer. In addition to the contactless magnetic levitation, the advantage results here of a very compact and space-saving configuration.

In addition, the principle of the bearingless motor also allows designs in which the rotor can be very easily separated from the stator. This is a very big advantage since the rotor can thus be configured as a single-use part for single use, for example. Such single-use applications today frequently replace processes in which all those components, which come into contact with the substances to be treated in the process previously had to be cleaned and sterilized in a complex manner, for example by steam sterilization, due to the very high purity demands. In the configuration for single use, those components which come into contact with the substances to be treated are only used exactly once and are then replaced with new, that is unused, single-use parts in the next application.

The pharmaceutical industry and the biotechnological industry can be named as examples here. Solutions and suspensions are frequently prepared here, which require a careful blending or conveying of the substances.

In the pharmaceutical industry, for example in the production of pharmaceutically active substances, very high demands are made for cleanliness, the components which come into contact with the substances often even have to be sterile. Similar demands also result in biotechnology, for example in the preparation, treatment or cultivation of biological substances, cells or microorganisms, where an extremely high degree of purity has to be ensured in order not to endanger the usability of the product produced. As a further example, bioreactors can be named here in which, for example, biological substitutes for tissue or special cells or other very sensitive substances are cultivated. Pumping, stirring or mixing devices are also required here in order, for example, to ensure a continuous blending of the nutrient fluid or to ensure its continuous circulation in the mixing tank. A very high purity has to be ensured in this respect to protect substances or the produced products from contamination.

In such applications, the pumping, stirring or mixing device is then composed of a single-use device and of a reusable device. In this respect, the single-use device comprises those components which come into contact with the substances and which are configured as single-use parts for single use. This is, for example, the pumping or mixing tank with the rotor which is provided therein, which then, for example, comprises an impeller for conveying the substances. The reusable device comprises those components which are used permanently, i.e. multiple times, for example the stator. Such a device is disclosed, for example, in EP-B-2 065 085.

It is an important criterion for the manufacture or design of single-use parts for single use that they can be assembled as easily as possible with the reusable device or its components. It is desirable that this assembly can take place with as little effort as possible, with little work, fast and preferably without tools.

A particularly advantageous configuration that is known per se is to configure the initially described temple motor as a bearingless motor—irrespectively of whether it comprises components for single use or not. Such a configuration is also disclosed, for example, in EP-A-3 232 549.

In the configuration of the temple motor 1' as a bearingless motor shown in FIG. 1, the coil cores 4'—here, for example, six coil cores 4'—are arranged with the bar-shaped longitudinal limbs 41' and the transverse limbs 42' in a circular manner and equidistantly around the rotor 3' (internal rotor). The first ends of the longitudinal limbs 41' are connected by a reflux 5' in the radial direction, the reflux comprising a plurality of segments that are each arranged between two adjacent coil cores 4'. The permanent magnetic disk-shaped rotor 3' is arranged between the radially inwardly disposed end of the transverse limbs 42' and rotates about the axial direction A' in the operating state, wherein the rotor 3' is contactlessly magnetically driven and contactlessly magnetically levitated with respect to the stator 2', and wherein the radial position of the rotor 3' is regulated such that it is located in a centered position between the transverse limbs 42'.

The longitudinal limbs 41' bear windings to generate the electromagnetic rotational fields required for the magnetic drive and for the magnetic levitation of the rotor 3'. In the configuration shown in FIG. 1, the windings are configured, for example, such that a discrete coil 61' is wound around each longitudinal limb 41', i.e. the coil axis of each coil 61' respectively extends in the axial direction A'. It is typical for the temple motor in this respect that the coil axes of the coils 61' extend in parallel with the desired axis of rotation and that the coils 61' or the windings are not arranged in the magnetic rotor plane C'. The magnetic rotor plane C' is the magnetic center plane of the magnetically effective core 31' of the rotor 3'. This is that plane perpendicular to the axial direction A' in which the rotor 3' or the magnetically effective core 31' of the rotor 3' is levitated in the operating state. As a rule, and in particular in the configuration of the magnetically effective core 31' of the rotor 3' as a disk shown in FIG. 1, the magnetic rotor plane C' is the geometrical center plane of the magnetically effective core 31' of the rotor 3' which lies perpendicular to the axial direction A'. As FIG. 1 shows, the coils 61' are arranged beneath the magnetic rotor plane C' and preferably beneath the magnetically effective core 31' of the rotor 3'.

One of the advantages of the configuration as a temple motor is that no windings or winding heads of the stator are present in the magnetic rotor plane C'. This makes it possible, for example in an application of the temple motor in a centrifugal pump, that the outlet of the centrifugal pump can be provided in the plane in which the impeller of the pump rotor rotates, i.e. the outlet lies at the same level with respect to the axial direction A' as the vanes of the pump rotor, without the windings of the stator interfering in this respect. This central, i.e. middle, arrangement of the pump outlet is particularly favorable under hydrodynamic aspects and specifically with respect to the passive support and stabilization of the rotor against tilts.

Another aspect in the conception of electromagnetic rotary drives with magnetically driven and magnetically levitated rotor—not only but also in connection with components for single use—is a manufacture as economical and cost-effective as possible. In this respect, value is in particular also placed on well-priced, simple starting materials such as commercial plastics. An environmentally aware handling and a responsible use of the available resources are also major aspects.

It is common practice according to today's state of the art, in particular to use metals of rare earths or compounds or alloys of these metals for permanent magnets, which are arranged in the stator and/or the rotor, because very strong permanent magnetic fields can be generated using them due to their magnetic properties. Known and frequently used examples of these rare earths are neodymium and samarium. However, such metals represent a substantial cost factor due to their comparatively small occurrence and due to their complex mining and processing. In addition, the waste disposal of such permanent magnets after a single use, for example, is frequently also associated with problems or a high effort under technical environmental aspects, whereby additional costs arise. It is therefore often desirable from an economic, cost and environmental point of view to keep the use of permanent magnet materials in both the stator and the rotor as low as possible. This is particularly desirable for single-use applications.

Starting from this state of the art, it is an object of the invention to provide a different electromagnetic rotary drive with a magnetically levitated rotor, which is configured as a temple motor and which can be used for a plurality of applications. The rotary drive should be as economical and cost-effective as possible to manufacture. Furthermore, the rotary drive should also be suitable for applications with single-use components. In addition, it is an object of the invention to propose a rotational device for conveying, pumping, mixing or stirring fluids which comprises such a rotary drive.

The subjects of the invention meeting this object are described herein.

According to one aspect of the invention, an electromagnetic rotary drive is therefore proposed, which is configured as a temple motor, having a rotor which is contactlessly magnetically drivable, which is configured as coil-free and free of permanent magnets and which comprises a disk-shaped magnetically effective core, and having a stator being designed as a bearing and a drive stator, by which the rotor is contactlessly magnetically drivable about a desired axis of rotation in the operating state, and with which the rotor can be contactlessly magnetically levitated with respect to the stator, wherein the stator has a plurality of coil cores, each of them comprising a bar-shaped longitudinal limb extending from a first end in a direction in parallel with a desired axis of rotation up to a second end and a transverse limb being arranged at the second end of the longitudinal limb and extending in a radial direction, which is perpendicular to an axial direction defined by the desired axis of rotation, wherein a plurality of windings is provided for generating an electromagnetic rotational field, each of the windings surrounding one of the longitudinal limbs, wherein the stator is configured free of permanent magnets, wherein the rotor is configured as a ferromagnetic or ferrimagnetic rotor, which exactly has one preferential magnetic direction extending in the radial direction, and wherein the magnetically effective core of the rotor has a magnetic resistance in the preferential magnetic direction, which magnetic resistance is at most half as large as the magnetic resistance in a direction, which stands perpendicular on the preferential magnetic direction and perpendicular on the axial direction.

An electromagnetic rotary drive is thus proposed by embodiments of the invention, which is configured according to the principle of the bearingless motor and as a temple motor, wherein both the stator and the rotor of the rotary drive are free of permanent magnets. This means that neither the stator nor the rotor has permanent magnets which contribute to the generation of the drive torque or to the generation of force for the magnetic levitation of the rotor. A major aspect in this respect is that the magnetically active core of the rotor, which is configured to be free of permanent magnets and to be disk-shaped, has a strong anisotropy in its magnetic resistance. By the fact that the magnetically effective core has exactly one preferential magnetic direction, in which its magnetic resistance is clearly smaller than in the direction perpendicular to it, in the operating state, the rotor behaves similarly to a permanent magnet rotor which has two magnetic poles, i.e. it has the pole pair number 1. This combination of the disk-shaped configuration with the strong magnetic anisotropy, which is comparable to that of a bipolar rotor, enables a reliable magnetic drive of the rotor with a simultaneous contactless magnetic levitation of the rotor with respect to the stator, although no permanent magnetic pre-magnetization is provided. What is surprising is that in spite of the dispensing with of a permanent magnetic pre-magnetization, a sufficiently large magnetic flux can be generated to reliably magnetically levitate and drive the rotor. This is also surprising because the distance in the radial direction between the stator and the magnetically effective core of the rotor cannot be made arbitrarily small, because, depending on the configuration, different jackets, gaps and walls, in particular a jacket of the magnetically effective core of the rotor, the fluid gap or a separating can which surrounds the stator, are accommodated in the region between the stator and the magnetically effective core of the rotor. Therefore, in practice, a spacing of at least one millimeter, better 4-6 millimeters, is often preferred between the stator and the magnetically effective core of the rotor.

The bipolar configuration of the rotor in the operating state caused by the magnetic anisotropy represents the minimum possible pole pair number of the rotor. The low pole pair number of the rotor of one is advantageous both with regard to the drive of the rotor and with regard to its magnetic levitation, because, particularly at higher rotational frequencies of the rotor, the power dissipations which occur due to the control of the drive and the levitation of the rotor are considerably lower than with rotors which have a higher magnetic pole pair number. In addition, this low pole pair number of the rotor makes it particularly easy to control the position of the rotor in the radial direction.

Furthermore, this configuration of the rotor or its disk-shaped magnetically effective core, which is comparable to a reluctance rotor with the pole pair number 1, is also very advantageous with regard to minimizing the detent torques or the cogging.

In addition, the rotor is normally designed free of a cage. This means that the rotor does not have a cage, as is typically the case with cage rotors or short circuit rotors. In the case of an induction motor, for example, the rotor is equipped with such a cage, which usually consists of conductor bars, which are connected to each other at the ends. In the case of the rotary drive according to the invention, the rotor usually does not have such a cage, i.e. it is free of cages.

By completely dispensing with of permanent magnets, which contribute to the generation of the drive flux or control flux or the drive torque and the magnetic bearing forces, both in the stator and in the rotor, the rotary drive according to the invention can be produced particularly easily, economically and cost-effectively. This is a great advantage not only, but also for applications with single-use components.

The dispensing with of permanent magnets is therefore also advantageous from an economic, cost and environmental point of view, because the rare earth metals commonly used in the manufacture of permanent magnets, such as neodymium and samarium, or compounds or alloys of these metals, are not required for the rotary drive according to the invention.

Preferably, the magnetically effective core of the rotor comprises a ferromagnetic material, wherein the ferromagnetic material has a volume fraction of 30% to 80%, preferably 40% to 75%, and particularly preferred 50% to 70% of the magnetically active core. The ferromagnetic material is particularly preferred a soft magnetic material, especially iron or silicon iron. The volume fraction of the ferromagnetic material, which in the following is also referred to as the degree of filling, indicates the percentage fraction, which the ferromagnetic material occupies of the magnetically effective core of the rotor, or in other words, what percentage of the volume of the magnetically active core consists of the ferromagnetic material. In practice, a volume fraction of 30-80% of the ferromagnetic material has proven itself, depending on the application, wherein the higher values are advantageous when a high passive stiffness of the magnetic levitation is desired. A preferred range for the volume fraction of the ferromagnetic material is the range from 40% to 75%, whereby the range from 50%-70% is particularly preferred for many applications.

With regard to the magnetic levitation of the rotor and especially with regard to a passive magnetic stabilization of the rotor against tilting, it is preferred that the disk-shaped magnetically effective core of the rotor has a diameter which is greater than 2 times, preferably greater than 2.4 times, the axial height of the magnetically effective core.

According to a particularly preferred embodiment, the magnetically effective core of the rotor comprises a plurality of bar-shaped ferromagnetic elements, which each extend perpendicular to the axial direction and which are arranged parallel and spaced apart to each other. The desired magnetic anisotropy of the magnetic resistance of the magnetically effective core of the rotor can be realized in a particularly simple way by this arrangement.

Due to the parallel bar-shaped ferromagnetic elements, the rotor has exactly one preferential magnetic direction, namely that direction that is defined by the longitudinal extension of the bar-shaped ferromagnetic elements. Since the bar-shaped ferromagnetic elements are arranged spaced apart from each other, the magnetic resistance is significantly greater in the direction, which stands perpendicular on the preferential magnetic direction and perpendicular on the axial direction than in the preferential magnetic direction. Thus, the magnetic flux in the magnetically effective core is at least mainly conducted in the preferential magnetic direction, namely in the direction of the longitudinal extension of the bar-shaped ferromagnetic elements. In the transverse direction, i.e. in the direction between two adjacent bar-shaped ferromagnetic elements, the magnetic flux is at least negligibly small.

The space between two adjacent bar-shaped ferromagnetic elements is preferably filled with a low-permeable material, i.e. with a material that has only a low magnetic permeability (magnetic conductivity). This low-permeable material can be air, for example, or a plastic or a paramagnetic metal or a diamagnetic metal, or combinations of these materials. Within the framework of this application, materials whose permeability number (relative permeability) deviates only slightly or not at all from 1 (permeability number of the vacuum) are understood to be low-permeable, as is generally the case. In any case, a low permeability material has a permeability number that is less than 1.1. The low-permeable material thus represents flux barriers which at least largely prevent the magnetic flux from flowing perpendicular to the preferential magnetic direction from a ferromagnetic element to an adjacent ferromagnetic element.

In order to increase the mechanical stability of the magnetically active core of the rotor, it is a preferred measure if the magnetically active core of the rotor has a plurality of transverse webs, each connecting two adjacent ferromagnetic elements. These transverse webs can, but do not have to, include the same ferromagnetic material as the bar-shaped ferromagnetic elements, but have only a mechanical function. In particular, if the transverse webs includes a ferromagnetic material, they are geometrically dimensioned in such a way that they do not or only insignificantly influence the desired magnetic anisotropy of the magnetically effective core. This can be achieved, for example, by making the transverse webs much thinner than the bar-shaped ferromagnetic elements. Preferably, the cross-sectional area perpendicular to the longitudinal extension of each transverse web is at least a factor of 4, preferably at least a factor of 9, smaller than the corresponding cross-sectional area of the bar-shaped ferromagnetic elements. This causes the transverse webs to saturate magnetically practically immediately in the operating state, i.e. they reach the range of saturation magnetization, so that they no longer make a significant contribution to magnetic flux conduction and thus change the magnetic anisotropy of the rotor only insignificantly.

In order to reduce eddy current losses, the magnetically effective portion of the rotor is preferably made of sheet metal from a plurality of rotor elements, wherein the rotor elements are preferably stacked in an axial direction. Of course, it is also possible to stack the individual rotor elements in a radial direction. It is understood that the sheet metal configuration refers to the ferromagnetic or metallic components of the magnetically effective core.

It is a further preferred measure that the magnetically effective core of the rotor comprises a radially outwardly disposed ring which surrounds all bar-shaped ferromagnetic elements. This ring can be integrally manufactured with the bar-shaped ferromagnetic elements so that the ring connects the individual ferromagnetic elements with each other. The ring is then preferably made of the same material as the ferromagnetic elements. In this case, the ring improves the constancy of the torque seen over the rotation of the rotor.

The ring can also serve as a measuring surface for sensors, such as position sensors, with which the position of the rotor in the radial plane or in the radial direction is determined.

It is also possible to configure the ring as a separate component, which is then arranged around the bar-shaped ferromagnetic elements so that they are surrounded by the ring. Furthermore, it is possible that the ring is manufactured from an electrically conductive material, which is different from the ferromagnetic material of the magnetically effective core of the rotor. In this case, the ring serves mainly to mechanically stabilize the magnetically effective core of the rotor and as a measuring surface for sensors.

The sensor system required for the control and regulation of the rotor position can be simplified by the radially outwardly disposed ring, whether it is made of ferromagnetic material or of electrically conductive material, because the desired spacing of the rotor from the coil cores is a constant value viewed over the periphery of the rotor.

In order in particular to minimize eddy current losses in the stator, it is advantageous if each of the coil cores are each manufactured of sheet metal from elements, wherein the elements are stacked in the peripheral direction of the rotor.

A further advantageous measure is that the end faces of the transverse limbs of the coil cores facing the rotor have a height in the axial direction that is respectively larger than the axial height of the magnetically effective core of the rotor. A greater or better passively magnetic stabilization of the rotor with respect to tilts with respect to the desired axis of rotation in particular results from this. In addition, the higher end faces of the transverse limbs result in a concentration of the magnetic flux.

Preferably, the end faces of the transverse limbs of the coil cores facing the rotor are each curved as segments of a circular cylinder, which is coaxial with the rotor so that the rotor has a constant distance from the end face in a centered state in the radial direction viewed over the respective end face. On the one hand, the effective magnetic air gap between the stator and the rotor is kept as small as possible by this curved configuration of the end faces, which follows the curvature of the rotor. On the other hand, the torque exerted onto the rotor becomes especially constant viewed over the rotation of the rotor by the constant distance between the rotor and the end faces of the transverse limbs viewed over the periphery of the rotor, i.e. fluctuations of the torque are at least significantly reduced. This also significantly reduces torque triplets and detent torques.

To determine the position of the rotor in the radial plane (magnetic rotor plane), preferably a plurality of position sensors is provided to determine the position of the rotor, each position sensor being arranged between two adjacent coil cores.

It is also advantageous if a plurality of angle sensors is provided to determine the angular position of the rotor. The angular position of the rotor refers to the rotor angle, which describes the momentary rotational position of the rotor in the radial plane with respect to a freely definable zero position. The angle sensors are preferably designed as Hall sensors.

A rotational device for conveying, pumping, mixing or stirring fluids is further proposed by the invention, which rotational device comprises an electromagnetic rotary drive configured according to the invention, wherein the rotor of the rotary drive is configured as a rotor of the rotational device. This embodiment, also known as integral rotor, enables a particularly compact configuration of the rotary machine, because the rotor of the electromagnetic rotary drive is simultaneously also the rotor of the rotary machine with which a force is exerted on the fluid to be conveyed or to be mixed or to be stirred.

According to an embodiment, the rotor is configured as a pump rotor and has a plurality of vanes for conveying a fluid. In particular, the rotary machine can then be configured as a centrifugal pump in which the rotor forms the running wheel or impeller of the pump, with which the fluid is conveyed from an inlet of a pump housing to an outlet of a pump housing.

If the rotor is configured as a pump rotor, the rotor has a plurality of relief channels, which extend respectively in an axial direction through the magnetically effective core of the rotor, wherein each relief channel is arranged in such a way that the ferromagnetic material of the magnetically effective core of the rotor is completely free of relief channels. The relief bores serve, at least partially, to compensate the axial thrust on the rotor, thus relieving the magnetic axial levitation. The relief channels in the magnetically effective core of the rotor preferably run only through the low-permeable material, i.e. the flux barriers, so that the ferromagnetic material, i.e. for example the bar-shaped ferromagnetic elements, is neither penetrated nor affected by these relief channels.

In particular, the rotational device according to the invention may also be configured in such a manner that it comprises single-use components. In this configuration, the rotational device preferably has a single-use device, which is configured for single use and a reusable device, which is configured for multiple use, wherein the single-use device comprises at least the rotor, which has a plurality of vanes for conveying, pumping, mixing or stirring the fluid or the fluids, and wherein the reusable device comprises at least the stator, by which the rotor is contactlessly magnetically drivable and levitatable in the operating state. If the rotational device is configured as a pump, the single-use components preferably also comprise the pump housing in which the rotor is arranged.

Further advantageous measures and embodiments of the invention result from the dependent claims.

BRIEF DESCRIPTION OF THE DRAWINGS

The invention will be explained in more detail hereinafter with reference to the drawings.

DETAILED DESCRIPTION OF THE EMBODIMENTS

Figure 1:
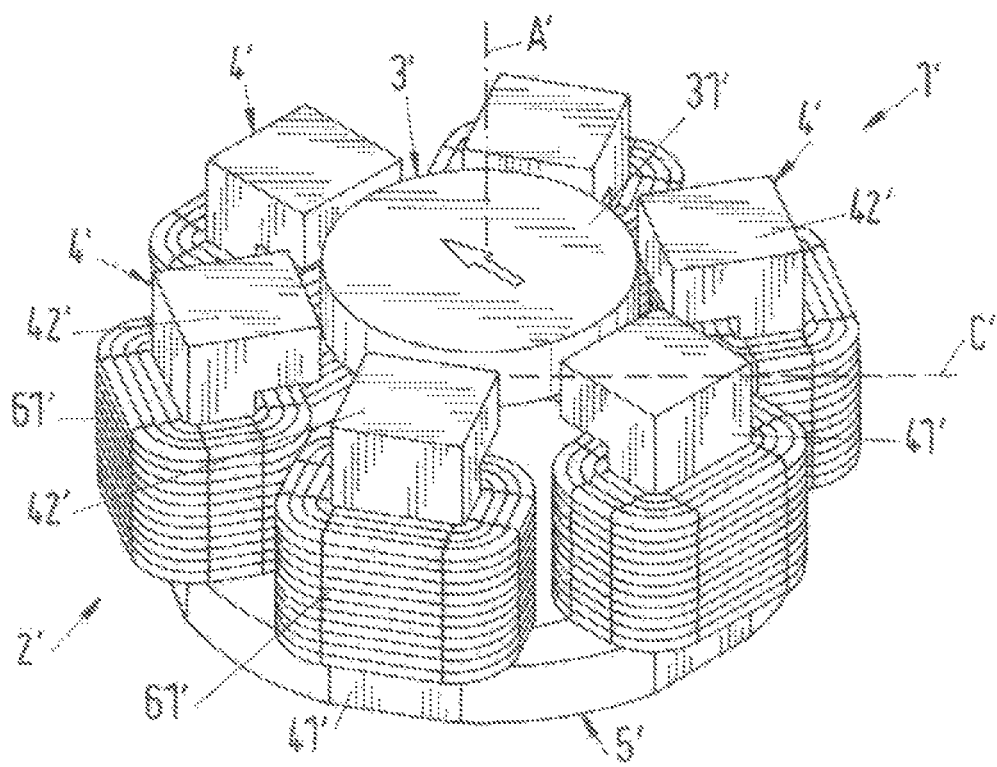
FIG. 1 is a perspective representation of a temple motor according to the state of the art.

As already mentioned and described, an electromagnetic rotary drive configured as a temple motor, which is known from the state of the art is shown in FIG. 1.

Figure 2:
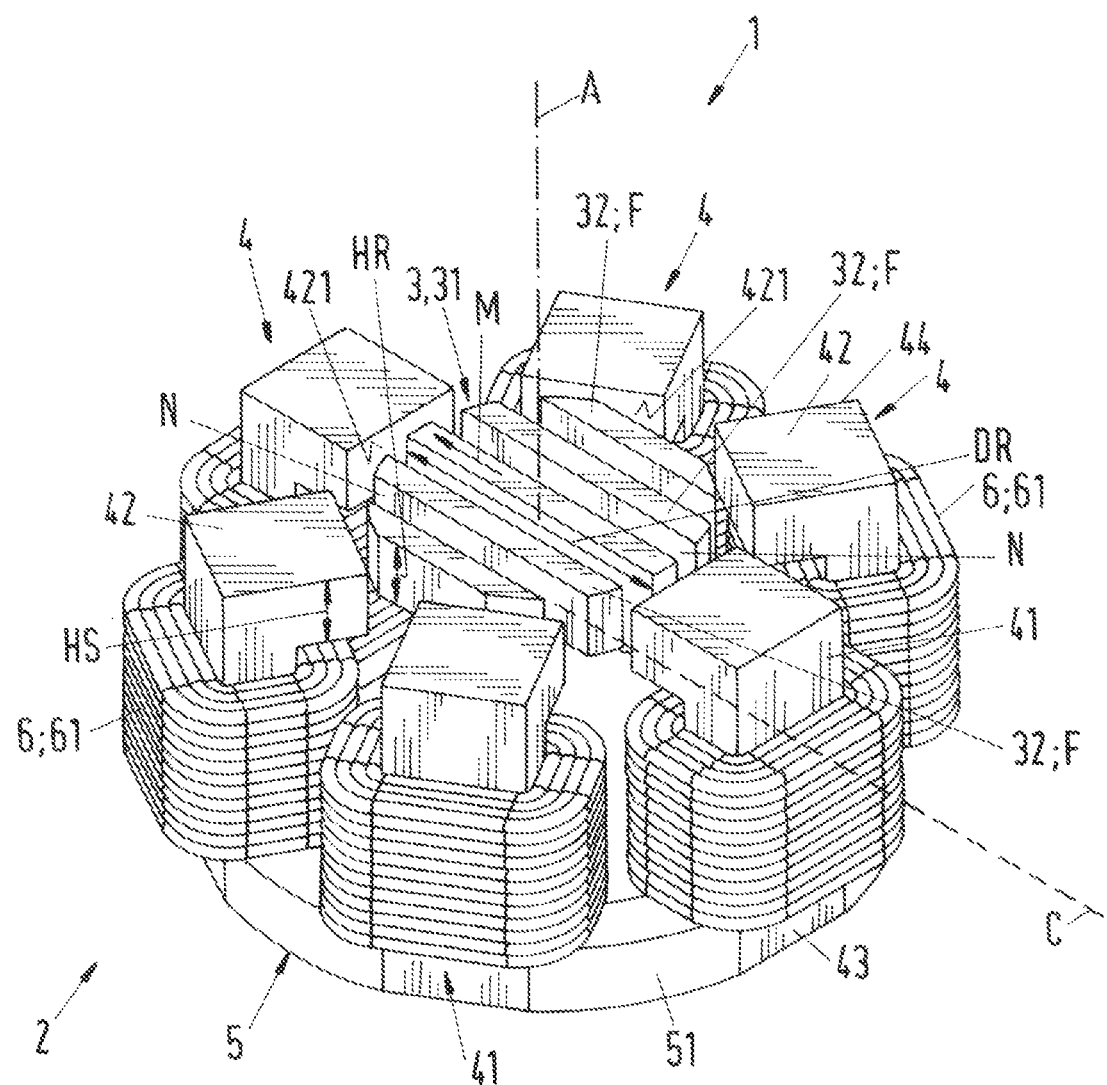
FIG. 2 is a perspective representation of a first embodiment of an electromagnetic rotary drive according to the invention.

FIG. 2 shows a perspective representation of a first embodiment of an electromagnetic rotary drive according to the invention, which is designated as a whole with the reference sign 1. The rotary drive 1 is configured as a temple motor and comprises a stator 2 and a rotor 3 being contactlessly magnetically levitated in the stator 2, which rotor is configured free of coils, free of a cage and free of permanent magnets. The stator 2 is also free of permanent magnets. The rotor 3 comprises a magnetically effective core 31, which is configured in the shape of a circular disk or of a circular cylinder of the height HR (see also FIG. 4) and with the diameter DR. The term "magnetically effective core 31" means that region of the rotor 3, which interacts with the stator 2 for the torque generation and for generating the magnetic levitation forces. In the operating state, the rotor 3 is contactlessly magnetically drivable about a desired axis of rotation by the stator 2. The desired axis of rotation refers in this respect to that axis around which the rotor 3 rotates in the operating state, when the rotor 3 is in a centered and non-tilted position with respect to the stator 2. This desired axis of rotation defines an axial direction A. Usually, the desired axis of rotation defining the axial direction A is the same as the center axis of the stator 2.

Since it is sufficient for the understanding of the invention, only the respective magnetically effective core 31 of the rotor 3 is shown in the embodiments and variants of the electromagnetic rotary drive 1 described in the following. It is understood that the rotor 3 can naturally also comprise still further components such as jackets or encapsulations which are preferably manufactured from a plastic or such as vanes for mixing, stirring or pumping a fluid or such as other components (see FIG. 30, for example).

A direction that stands perpendicular on the axial direction A is called a radial direction in the following. Furthermore, the magnetic center plane of the magnetically effective core 31 of the rotor 3 is called the magnetic rotor plane C. It is that plane perpendicular to the axial direction A in which the rotor 3 or the magnetically effective core 31 of the rotor 3 is levitated in the operating state when the rotor 3 is not tilted. As a rule, the magnetic rotor plane C of a disk-shaped magnetically effective core 31 is the geometrical center plane of the magnetically effective core 31 of the rotor 3 which is disposed perpendicular to the axial direction A. That plane in which the rotor 3 is levitated in the operating state is also called the radial plane. The radial plane defines the x-y plane of a Cartesian coordinate system whose z axis extends in the axial direction A. If the rotor 3 is not tilted, the radial plane coincides with the magnetic rotor plane C.

The characteristic feature in a configuration as a temple motor is that the stator 2 comprises a plurality of separate coil cores 4—here six coil cores 4—of which each comprises a bar-shaped longitudinal limb 41 which extends from a first end 43 in an axial direction A up to a second end 44, wherein all the first ends 43—they are the lower ends according to the representation in FIG. 2—are connected to each other by a reflux 5. In this respect, the reflux 5 comprises a plurality of segments 51 of which each connects the respective first end 43 of a coil core 4 to the first end 43 of an adjacent coil core 4. The longitudinal limbs 41 have a rectangular cross-section perpendicular to the axial direction.

Each coil core 4 further comprises a transverse limb 42, which is arranged at the second end 44 of the respective longitudinal limb 41 and which extends in a radial direction, i.e. perpendicular to the axial direction A and thus, perpendicular to the respective longitudinal limb 41. Each transverse limb 42 extends in the radial direction towards inside, i.e. towards the rotor 3. Each coil core 4 thus has an L-shaped configuration, wherein the longitudinal limbs 41 each form the long limb of the L which extends in the axial direction A and the transverse limbs 42 which extend perpendicular to the longitudinal limbs 41 toward the rotor 3 in the radial direction form the short limb of the L.

Each transverse limb 42 has a radially inwardly disposed end face 421 that faces the rotor 3. In this respect, the end face 421 is arranged such that its center line that is in parallel with the radial plane is disposed in the magnetic rotor plane C, i.e. in that plane in which the rotor 3 is levitated in the operating state. In the operating state, the rotor 3 is contactlessly magnetically levitated between the transverse limbs 42 of the coil cores 4 or between the end faces 421 of the transverse limbs 42.

The reflux 5 or its segments 51 and the coil cores 4 are each produced from a soft magnetic material because they serve as flux conducting elements for conducting the magnetic flux. Suitable soft magnetic materials are, for example, ferromagnetic or ferrimagnetic materials, that is in particular iron, nickel-iron or silicon iron. In this respect, a configuration as a metal sheet stator packet is preferred in which the individual coil cores 4 and the segments 51 are made of sheet metal, i.e. they consist of a plurality of thin elements that are stacked. Specific embodiments of the coil cores 4 will be explained further below in connection with FIGS. 6 to 8.

As FIG. 2 also shows, the individual coil cores 4 are preferably arranged such that they surround the rotor 3 in circular form and are arranged equidistant on this circle. The number of six coil cores 4 is to be understood as exemplary in this respect. A different number of coil cores 4 can naturally also be provided, for example eight or twelve or four coil cores 4, wherein an even number of coil cores 4 is preferred for technical regulation reasons. A number of six or eight or twelve coil cores 4 has proven advantageous for many applications.

The parallel aligned longitudinal legs 41 of the coil cores 4, which all extend parallel to the axial direction A, and which surround the rotor 3, are what gave the temple motor its name, because these parallel longitudinal limbs 41 are reminiscent of the columns of a temple.

The stator 2 further comprises a plurality of windings 6 for generating electromagnetic rotational fields, with which the rotor 3 is contactlessly magnetically drivable and contactlessly magnetically levitatable with respect to the stator 2. In the first embodiment, a total of six individual coils 61 are provided as windings 6, wherein a respective coil 61 is provided at each of the longitudinal limbs 41. Each coil 61 is arranged around the respective longitudinal limb 41 such that the coil axis is respectively disposed in parallel with the axial direction A and thus perpendicular to the magnetic rotor plane C. In the first embodiment shown in FIG. 2, each longitudinal limb 41 supports exactly one coil 61. Of course, such configurations are also possible in which each longitudinal limb 41 supports more than one coil 61.

In the temple motor 1, the coils 61 of the stator 2 are generally arranged outside the magnetic rotor plane C, beneath the magnetic rotor plane C according to the representation (FIG. 2). The coils 61 are preferably arranged beneath the magnetically effective core 31. The coils 61 are therefore not arranged in the plane in which the rotor 3 is driven and levitated in the operating state. Unlike other electromagnetic rotary drives in which the coils of the stator are arranged such that the coil axes each lie in the magnetic rotor plane, that is in the plane in which the rotor is driven and levitated, in the temple motor 1, the coils 61 of the stator 2 are arranged such that the axes of the coils 61 stand perpendicular on the magnetic rotor plane C.

Within the framework of the present invention, an embodiment as a temple motor or a temple motor 1 is to be understood as such an electromagnetic rotary drive 1 that has a plurality of coil cores 4 of which each comprises a longitudinal limb 41 that respectively extends in parallel with the axial direction A, wherein the first ends 43 of all coil cores 4 are connected to one another via the reflux 5, and wherein the windings 6, 61 of the stator 2 are each arranged around the longitudinal limbs 41 such that the individual coils 61 are respectively aligned with their coil axes in parallel with the axial direction A. In a preferred embodiment, the electromagnetic rotary drive configured as a temple motor 1 is configured according to the principle of a bearingless motor. The temple motor 1 is in this case therefore a specific embodiment of a bearingless motor.

In a bearingless motor 1, the rotor 3 is contactlessly magnetically drivable and is contactlessly magnetically levitatable with respect to the stator 2. For this purpose, the stator 2 is configured as a bearing and drive stator by which the rotor 3 is contactlessly magnetically drivable about the desired axis of rotation in the operating state—i.e. it can be set into rotation—and is contactlessly magnetically levitatable with respect to the stator 2.

The bearingless motor is now well known to the person skilled in the art, so that a detailed description of its function is no longer necessary. The term bearingless motor means that that the rotor 3 is levitated completely magnetically, wherein no separate magnetic bearings are provided. For this purpose, the stator 2 is configured as a bearing and drive stator, it is therefore both the stator of the electric drive and the stator of the magnetic levitation. The stator 2 in this respect comprises the windings 6 by which a magnetic rotational field can be generated, which, on the one hand, exerts a torque on the rotor 3 which effects its rotation and which, on the other hand, exerts a shear force which can be set as desired on the rotor 3 so that its radial position—that is its position in the radial plane—can be actively controlled or regulated. At least three degrees of freedom of the rotor 3 can thus be actively regulated. The rotor 3 is passively magnetically stabilized, that is cannot be controlled, by reluctance forces with respect to its axial deflection in the axial direction A. The rotor 3 is also passively magnetically stabilized with respect to the remaining two degrees of freedom, namely tilts with respect to the radial plane perpendicular to the desired axis of rotation. The rotor 3 is thus passively magnetically levitated or passively magnetically stabilized in the axial direction and against tilts (three degrees of freedom) and it is actively magnetically levitated in the radial plane (two degrees of freedom). An active magnetic levitation is one that can be actively controlled or regulated, while a passive magnetic levitation is one that cannot be actively controlled or regulated.

Electromagnetic drive devices and bearing devices are known from the state of the art, in which the stator of the drive and the stator of the magnetic bearing are joined together to form a construction unit. The stator here comprises a bearing unit that includes one or of a plurality of bearing plane/planes and comprises a drive unit that is arranged between or beside these bearing planes. Such devices therefore show a bearing unit separated from the drive unit, which bearing unit only serves for the magnetic levitation. Such devices are, however, not to be understood as bearingless motors in the sense of the present application because actually separate bearing units are present here that realize the bearing of the rotor separately from the drive function. In a bearingless motor in the sense of the present invention, it is not possible to divide the stator into a bearing unit and into a drive unit. It is actually this property that gives the bearingless motor its name.

With a bearingless motor, unlike with classical magnetic bearings, the magnetic levitation and the drive of the motor is implemented via electromagnetic rotational fields whose sum, on the one hand, generates a drive torque on the rotor 3 as well as a transverse force that can be set as desired and with which the radial position of the rotor 3 can be regulated. These rotational fields can be generated either separately—that is using different coils—or the rotational fields can be generated by superposition by calculation of the required currents and then with the aid of a single coil system. In a bearingless motor, it is thus not possible to divide the electromagnetic flux generated by the coils of the stator into an electromagnetic flux that only drives the rotor and an electromagnetic flux that only realizes the magnetic bearing of the rotor.

The rotor 3 of the rotary drive 1 according to the invention is configured as coil-free, i.e. no windings are provided on the rotor. The rotor 3 comprises the magnetically effective core 31 which can be surrounded by a plastic jacket in dependence on the configuration. Examples for the embodiment of the rotor will be explained further below.

In the rotary drive 1 according to the invention, the rotor 3 or the magnetically effective core 31 of the rotor 3 does not have any permanent magnets, it is therefore free of permanent magnets. According to the invention, the stator 2 is also configured free of permanent magnets, so that the entire rotary drive 1 is configured free of permanent magnets, i.e. without permanent magnets. This measure allows a particularly inexpensive configuration of the rotary drive 1, since in particular no rare earths such as neodymium or samarium or compounds or alloys thereof are necessary for the manufacture of the rotary drive 1 which are frequently used for the manufacture of permanent magnets. The dispensing with of these permanent magnets in the rotary drive 1 also signifies a large advantage under environmental aspects.

Those ferromagnetic or ferrimagnetic materials which are hard magnetic, that is which have a high coercive field strength, are typically called permanent magnets. The coercive field strength is that magnetic field strength which is required to demagnetize a material. Within the framework of this application, a permanent magnet is understood as a material which has a coercive field strength, more precisely a coercive field strength of the magnetic polarization, which amounts to more than 10,000 A/m.

If the rotor 3 and the stator 2 are therefore free of permanent magnets, this means that the magnetically effective core 31 of the rotor 3 and the coil cores 4 and the reflux 5 only comprise materials whose coercive field strength amounts to at most 10,000 A/m.

The designation that the rotor 3 and the stator 2 are configured "free of permanent magnets" should be understood within the framework of this application that neither the rotor 3 nor the stator 2 comprise any permanent magnets which make a substantial contribution to the drive field for driving the rotation of the rotor 3 or to the generation of the magnetic levitation forces for the rotor 3. The generated magnetic flux for the drive and the levitation of the rotor 3 thus comprises no permanent magnetic excited flux. It is naturally possible that the rotor 3 and/or the stator 2 comprise other magnets or permanent magnets, for example in sensors, which, for example, serve for the detection of the angular position of the rotor or which otherwise satisfy a purpose which has nothing to do with the generation of the magnetic flux for the drive and the levitation of the rotor. The designation "free of permanent magnets" therefore only relates to the generation of the magnetic flux for the drive and the levitation of the rotor.

The designation "free of permanent magnets" with respect to the rotor is therefore to be understood within the framework of this application such that the rotor 3 or the stator 2 has no permanent magnets that contributes to the magnetic flux, by means of which the rotor 3 is magnetically driven and levitated.

According to the invention, the rotor 3 is configured as a ferromagnetic or ferrimagnetic rotor 3, which exactly has one preferential magnetic direction extending in a radial direction. The preferential magnetic direction is indicated by the arrow with the reference sign M in FIG. 2. The magnetically effective core 31 of the rotor 3 is represented once more by a schematic plan view in FIG. 9. The magnetically effective core 31 of the rotor 3 is configured with a strong magnetic anisotropy of its magnetic resistance (reluctance) or its magnetic conductance (reciprocal of reluctance). The magnetically effective core 31 has a magnetic resistance in the preferential direction M, which is significantly lower than its magnetic resistance in the radial direction, which stands perpendicular on the preferential magnetic direction M. In particular, the magnetic resistance of the magnetically effective core 31 in the preferential magnetic direction M is at most half as great as its magnetic resistance in the direction, which stands perpendicular on the preferential magnetic direction and perpendicular on the axial direction A. This radial direction, which stands perpendicular on the magnetic preferential direction M, is also referred to as transverse direction Q (FIG. 9) in the following.

Depending on the configuration, the magnetic anisotropy can also be much more pronounced. Thus, the magnetic resistance of the magnetically active core 31 in the transverse direction Q may be at least four times or at least ten times or at least one hundred times as great as the magnetic resistance of the magnetically active core 31 in the preferential magnetic direction M.

Since the magnetically effective core only has exactly one preferential magnetic direction M, the magnetic anisotropy in the magnetic resistance leads to the fact that the rotor 3, which is free of permanent magnets, behaves in a magnetic field like a two-pole rotor 3, i.e. like a rotor 3 with the magnetic pole pair number one.

In order to realize the desired magnetic anisotropy of the disk-shaped magnetically effective core 31 of the rotor 3, the magnetically effective core 31 preferably comprises a ferromagnetic material F, which is only a part of the total volume of the magnetically active core 31. Preferably, the ferromagnetic material F has a volume fraction of 30% to 80% of the total volume of the magnetically active core 31. This volume fraction, which is taken up by the ferromagnetic material F, is also referred to in the following as the degree of filling. Preferred is the volume fraction of the ferromagnetic material F 40% to 75% of the total volume of the magnetically effective core 31, whereby the range from 50% to 70% is particularly preferred.

The ferromagnetic material F is particularly preferred a soft magnetic material, in particular iron, nickel-iron or silicon-iron.

In addition to the ferromagnetic material F, the magnetically effective core 31 of the rotor 3 comprises a low-permeable material N, i.e. a material that has only a low magnetic permeability (magnetic conductivity). This low-permeable material N can be air, for example, or a plastic or a paramagnetic metal or a diamagnetic metal or combinations of these materials. Within the framework of this application, materials whose permeability number (relative permeability) deviates only slightly or not at all from 1 (permeability number of the vacuum) are understood to be low-permeable, as is generally the case. In any case, a low-permeable material has a permeability number that is less than 1.1. The low-permeable material N or those regions of the magnetically effective core 31, which includes the low-permeable material N, form flux barriers for the magnetic flux, because the low-permeable material has a significantly lower magnetic conductivity than the ferromagnetic material F.

In a particularly preferred embodiment that is also illustrated in FIG. 2, the magnetically effective core 31 of the rotor 3 has a plurality of bar-shaped ferromagnetic elements 32, which each extend perpendicular to the axial direction A and which are arranged parallel and spaced apart to each other. The ferromagnetic elements 32 includes the ferromagnetic material F. Each of the ferromagnetic elements 32 is thus arranged in the magnetic rotor plane C, wherein all bar-shaped ferromagnetic elements 32 extend parallel to each other in the preferential magnetic direction M. In the transverse direction Q, a distance D (FIG. 9) is respectively provided between two adjacent ferromagnetic elements 32. The space between two adjacent bar-shaped ferromagnetic elements 32 is respectively filled with the low-permeable material N, which thus forms flux barriers between adjacent ferromagnetic elements 32.

Preferably, each bar-shaped ferromagnetic element 32 is configured such that it substantially forms a secant with respect to the circular surface of the disk-shaped magnetically effective core 31 of the rotor 3, i.e. each ferromagnetic element 32 extends completely through the magnetically effective core 31 of the rotor 3 with respect to the preferential magnetic direction M. With respect to the axial direction A, each ferromagnetic element 32 has an extension, which corresponds at least substantially to the axial height HR (see FIG. 4) of the magnetically effective core 31. Furthermore, the bar-shaped ferromagnetic elements 32 are preferably distributed equidistantly over the magnetically effective core 31, i.e. the distance D between two adjacent ferromagnetic elements 32 in the transverse direction Q is the same for all pairs of adjacent ferromagnetic elements 32.

Figure 9:
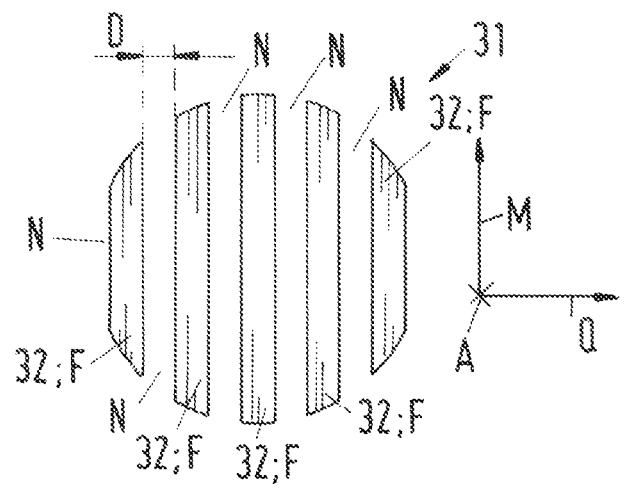
FIG. 9-21 are different variants for the embodiment of the rotor, each in a schematic plan view.

In FIG. 2 and FIG. 9, only the bar-shaped ferromagnetic elements 32 of the magnetically effective core 31 of rotor 3 are shown explicitly for reasons of better clarity. Those regions of the magnetically effective core 31 which include the low-permeable material N are each represented by voids. The representation in FIG. 2 and FIG. 9 is therefore to be understood that all those regions of the magnetically effective core 31 which are not occupied by the ferromagnetic elements 32 and which supplement the magnetic core 31 to form a complete circular disk, consist of the low-permeable material N.

Five parallel bar-shaped ferromagnetic elements 32 are provided in the embodiment of the magnetically effective core 31 of the rotor 3 shown in FIG. 2 and FIG. 9. The degree of filling is about 50%, i.e. the magnetically effective core 31 consists of about 50% of the ferromagnetic material F and about 50% of the low-permeable material N.

The magnetically effective core 31 preferably includes a jacket (not shown, but see e.g. FIG. 29), which completely encapsulates the magnetically effective core 31. The bar-shaped ferromagnetic elements 32 may be attached to this jacket. It is also possible that a plastic is used as the low-permeable material N for the magnetically effective core 31. Then recesses can be disposed in an appropriately disk-shaped plastic part, into which the bar-shaped ferromagnetic elements 32 are inserted so that they are fixed. The webs between the recesses in the plastic part then form the flux barriers between adjacent ferromagnetic elements. Of course, it is also possible for such a plastic part to be configured in one piece with the jacket for the magnetically effective core 31.

The ferromagnetic elements 32 of the magnetically effective core 31 can e.g. be manufactured by casting, stamping, pressing of soft magnetic powder with subsequent sintering, forging, shaping or assembling of parts such as metal sheets.

In the embodiment shown in FIG. 2 with the disk-shaped magnetically effective core 31 of the rotor 3, the rotor 3 is actively magnetically, i.e. controllably, levitated with respect to three degrees of freedom. They are the two degrees of freedom of the radial position of the rotor 3 in the radial plane and the degree of freedom of rotation. The rotor 3 is purely passively magnetically stabilized or levitated, that is not controllably stabilized, via reluctance forces with respect to the other three degrees of freedom. They are the two degrees of freedom of the tilts of the rotor 3 with respect to the radial plane and the axial position of the rotor 3, that is its position with respect to the axial direction A.

Particularly with regard to the passive magnetic stabilization of the rotor 3 against tilts, it is preferred that the disk-shaped magnetically effective core 31 of the rotor 3 has a diameter DR which is at least twice as large as the axial height HR of the magnetically effective core 31. The diameter DR of the magnetically effective core 31 is particularly preferred at least 2.4 times greater than its axial height HR in the axial direction A.

Classically in a bearingless motor, that is also in the specific configuration as a temple motor 1, the magnetic drive and bearing function is generated by the superposition of two magnetic rotational fields that are typically called the drive field and the control field. These two rotational fields generated by the windings 6 or coils 61 of the stator 2 as a rule have a pole pair number that differs by one. In this respect, tangential forces are generated on the rotor 3 by the drive field that act in the radial plane and that effect a torque, which effects the rotation of the rotor 3 about the axial direction A. A transverse force can additionally be generated on the rotor 3 in the radial plane by the superposition of the drive field and of the control field that can be set as desired and by which the position of the rotor 3 in the radial plane can be regulated.

It is, on the one hand, possible for the generation of the drive field and control field to use two different winding systems, namely one for generating the drive field and one for generating the control field. The coils for generating the drive field are then typically called drive coils and the coils for generating the control field are called control coils. The current that is imparted into these coils is then called the drive current or control current. On the other hand, it is, however, also possible to generate the drive and support function by only one single winding system such that there is no distinction between drive coils and control coils. This can be realized such that the respective values for the drive and control current determined by the control device are added or superposed by calculation—that is e.g. with the aid of software—and the total current resulting from this is imparted into the respective coils. In this case, it is naturally no longer possible to distinguish between control coils and drive coils. In the embodiment described here, the last-named variant is realized, that is there is no distinction between the drive coils and the control coils, but there is rather only one winding system in whose coils 61 the sum of drive current and control current determined by calculation is imparted. It is, however, naturally also possible to configure the rotary drive 1 according to the invention with two separate winding systems, namely in each case with separate drive coils and separate control coils.

According to the invention, both the rotor 3 and the stator 2 are configured free of permanent magnets. The magnetic flux required for the drive and magnetic levitation of the rotor 3 is therefore a purely electromagnetic flux, which is generated by the windings 6 or the coils 61.

In the operating state, electromagnetic rotational fields are generated by the coils 61 in the manner known from a bearingless motor and a tangential force on the rotor 3 can be generated by them, on the one hand, that effects a torque that drives the rotation of the rotor 3 and with which, on the other hand, a transverse force can be exerted on the rotor 3 in the radial direction that can be set as desired and by which the position of the rotor 3 can be actively magnetically regulated in the radial plane.

In order to magnetize the ferromagnetic rotor 3, it is possible for example, to additionally generate a stator current which does not generate a torque and which rotates with the rotor 3.

The power electronics required for the control of the coils 61 and the corresponding control and regulation devices are sufficiently known to the person skilled in the art and do not therefore need to be explained in more detail here. The configuration or the arrangement of the sensor system by which the radial position and the angular position of the rotor 3 can be detected will be looked at further below in connection with FIGS. 24 to 27.

In the operating state, the electromagnetic flux generated by the windings 6 or the coils 61 for the drive and levitation of the rotor 3 is conducted through the end faces 421 of the transverse limbs 42 to the magnetically effective core 31 of the rotor 3. The electromagnetic flux generated by current application by a coil 61 arranged on a longitudinal limb 41 of an individual coil core 4 is conducted through the longitudinal limb 41 and the transverse limb 42 inwardly in the radial direction toward the magnetic core 31 of the rotor 3, passes through the air gap between these coil cores 4 and the magnetically effective core 31 of the rotor 3, is conducted back by bar-shaped ferromagnetic elements 32 into the air gap, and thus gets back to one of the coil cores 4 and the reflux 5, whereby the field lines terminate.

In the first embodiment according to FIG. 2, the end faces 421 of the transverse limbs 42 facing the rotor 3 are each designed as plane surfaces, i.e. they are not curved. Each end face 421 has a height HS viewed in the axial direction A, the height being essentially the same as the axial height HR of the magnetically effective core 31 of the rotor 3 (see also FIG. 4).

Figure 3:
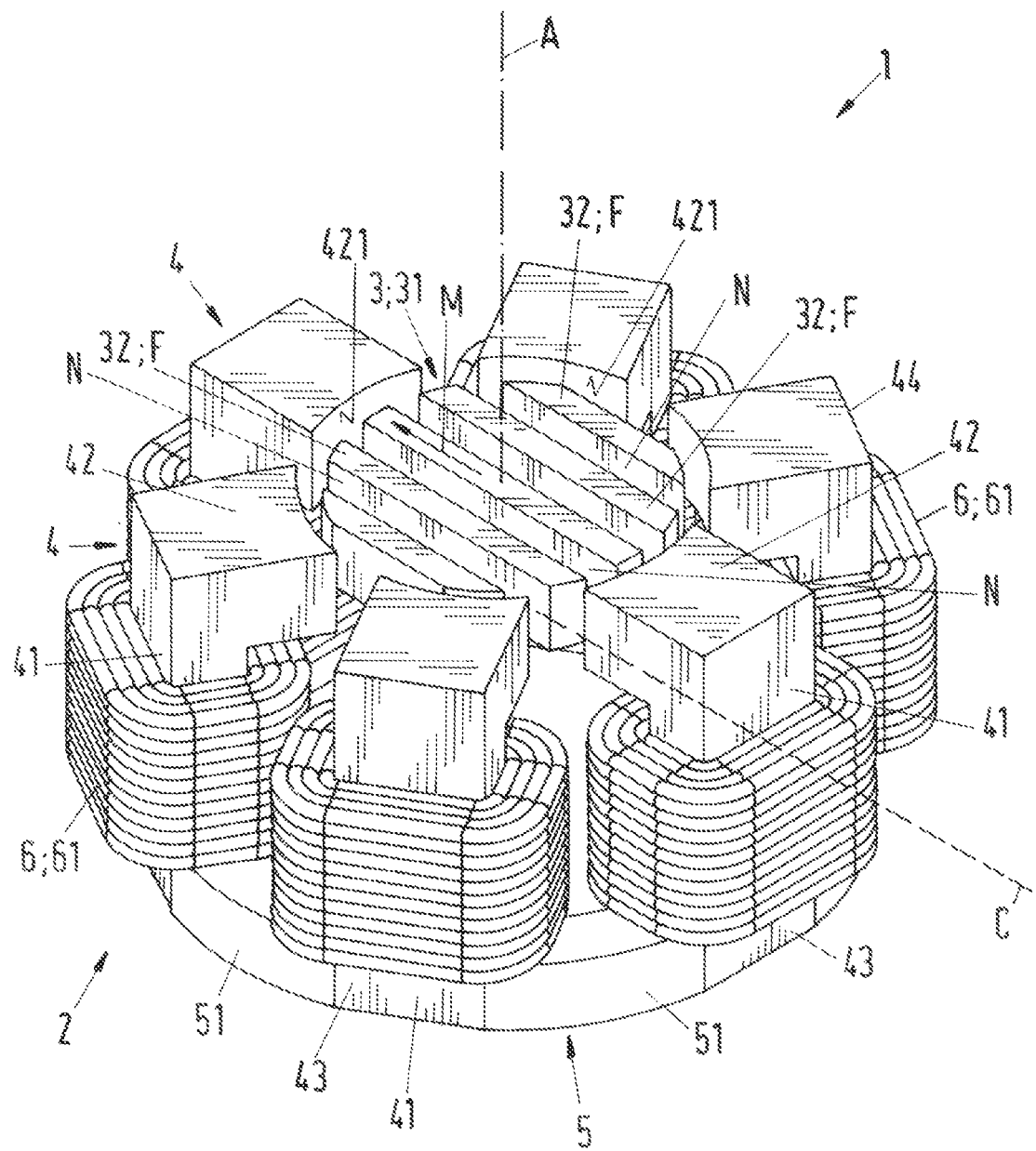
FIG. 3 is a perspective representation of a second embodiment of an electromagnetic rotary drive according to the invention.
Figure 4:
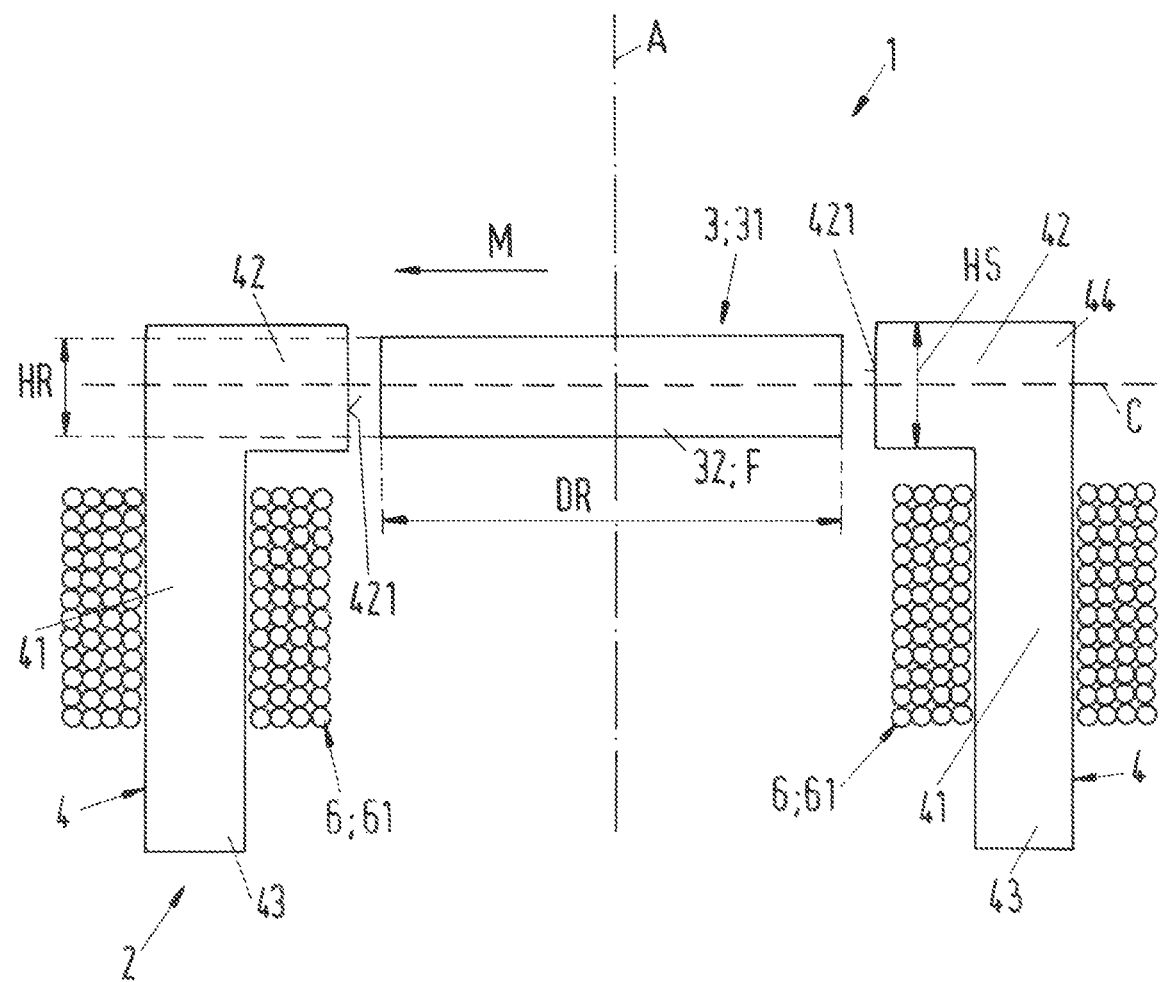
FIG. 4 is a schematic section through the second embodiment of FIG. 3 in an axial direction.
Figure 5:
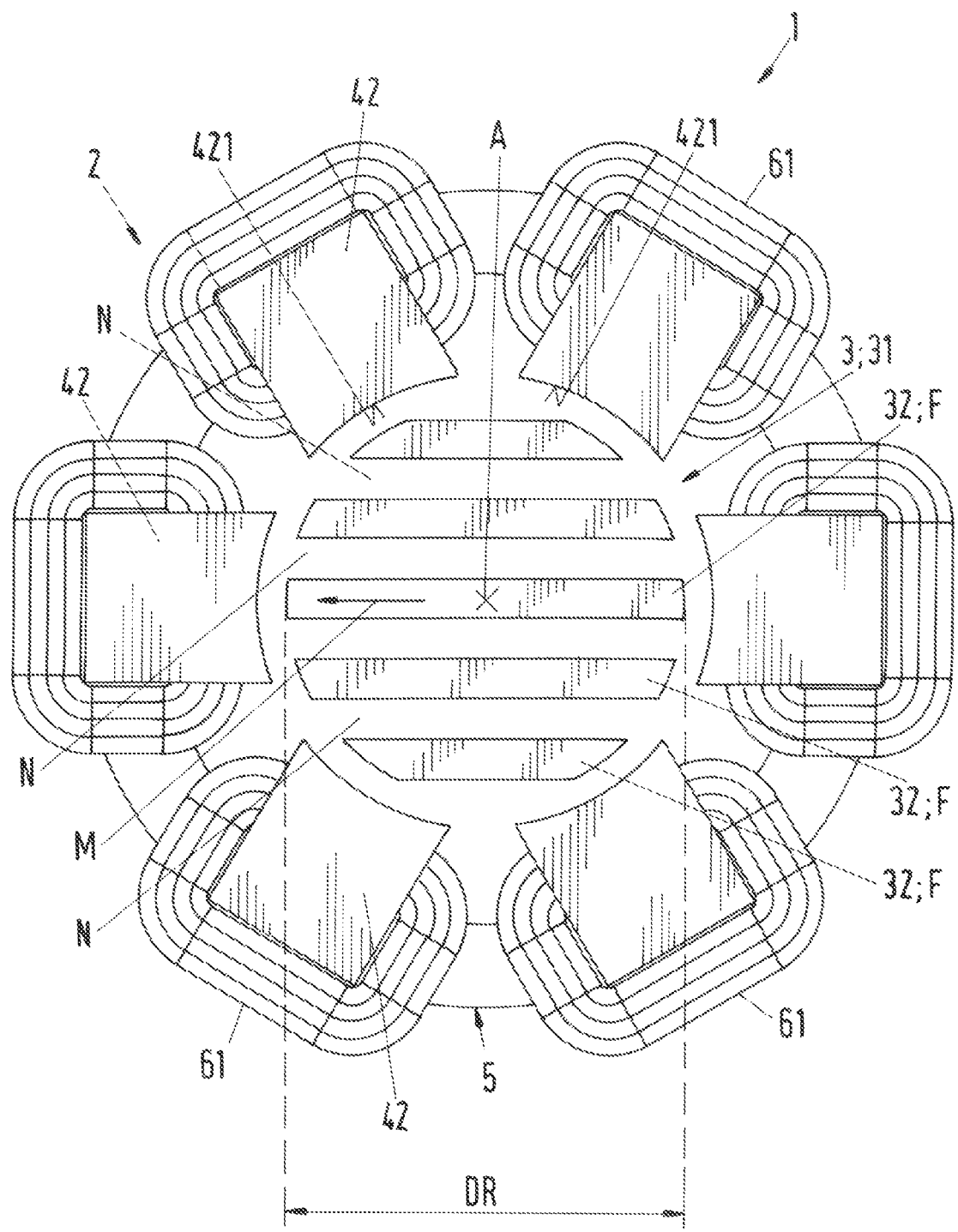
FIG. 5 is a plan view of the second embodiment of FIG. 3, FIG. 6-8 are different variants for the embodiment of the coil cores, each in a perspective representation.

FIG. 3 shows in a perspective representation a second embodiment of a rotary drive 1 according to the invention. For better understanding, FIG. 4 shows a schematic representation of a section through this second embodiment in the axial direction A and FIG. 5 shows a plan view of the second embodiment from the axial direction A. In the following, only the differences from the first embodiment will be looked at. The reference signs in particular have the same meaning as has already been explained in connection with the first embodiments. It is understood that all the above explanations also apply in the same manner or in accordingly the same manner to the second embodiment.

The second embodiment differs from the first embodiment by the configuration of the transverse limbs 42 with the end faces 421. In the second embodiment, the end face 421 of the transverse limb 42 facing the rotor 3 in each coil core 4 is configured, viewed in the axial direction, with a height HS (FIG. 4) that is larger than the axial height HR of the magnetically effective core 31 of the rotor 3 such that each of these end faces 421 projects upwardly and downwardly over the outer surface of the magnetically effective core 31 of the rotor 3 facing it with respect to the axial direction A. This can be recognized particularly well in FIG. 4.

This configuration with the height HS greater than the axial height HR is in particular especially advantageous with respect to the passive magnetic stabilization of the rotor 3 against tilts and against deflections with respect to the axial direction A. Since the end faces 421 have a greater extent in the axial direction A than the magnetically effective portion 31 of the rotor 3, the rotor 3 is considerably better passively magnetically stabilized against tilts with respect to the axial direction A or against displacements in the axial direction A. Furthermore, the larger end face 421 (larger compared to the first embodiment) also allows a larger magnetic flux to be conducted, and the transition from the end face 421 to the magnetically effective core 31 leads to an advantageous flux concentration.

A further difference to the first embodiment is that in the second embodiment, the end faces 421 of the transverse limbs 42 of the coil cores 4 facing the rotor 3 are each curved as segments of a circular cylinder, which is coaxial with the rotor 3. This ensures that the magnetically effective core 31—when the rotor 3 is in a centered state—has a constant distance from this end face 421 in the radial direction when viewed over the respective end faces 421. This means that the radial distance, viewed in the periphery of the rotor 3, between the magnetically effective core 31 and the end face 421 is constant over the entire end face 421.

On the one hand, the effective magnetic air gap between the stator 2 and the rotor 3 is configured as small as possible by this curved configuration of the end faces 421, which follow the curvature of the magnetically effective core 31. On the other hand, the torque exerted on the rotor 3, viewed over the rotation of the rotor 3, is particularly constant by the constant distance between the magnetically effective core 31 and the end faces 421 of the transverse limbs 42, viewed over the periphery of the magnetically effective core 31, i.e.

fluctuations of the torque are at least significantly reduced. This also significantly reduces torque triplets and detent torques.

In the following, different variants for the preferred embodiment of the coil cores 4 with the longitudinal limbs 41 and the transverse limbs 43 are explained with reference to FIGS. 6 to 8. As already mentioned, the coil cores 4 are preferably produced from a soft magnetic material, which conducts the magnetic flux well. Preferred soft magnetic materials comprise iron, nickel-iron or silicon iron.

The coil cores 4 each are preferably made of sheet metal. This can be seen in each of the FIGS. 6 to 8, which respectively shows a variant for the embodiment of the coil core 4 in a perspective representation. In the sheet metal configuration, the coil core 4 is made up of a plurality of thin elements 48 that are stacked on one another in parallel with one another. All the elements 48 are of identical configuration, that is they are each of L shape and also have the same thickness. As can be recognized in FIGS. 6 to 8, the elements 48 are stacked in the peripheral direction of the rotor 3 or of the stator 2. A plurality of parallel elements 48 therefore forms the coil core 4. So that the individual elements 48 remain together, they can be adhesively bonded or molded with a plastic. Eddy currents in the coil cores 4 can be effectively suppressed or reduced by this sheet metal configuration.

Figure 6:
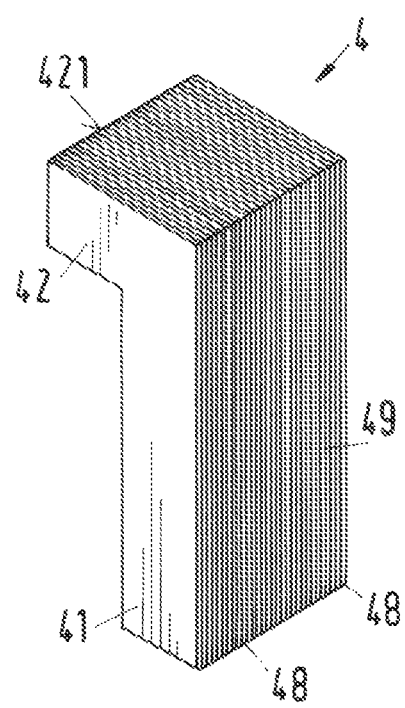

In the variant shown in FIG. 6 that corresponds to the coil core 4, which is shown in FIG. 2 for the first embodiment, the end face 421 of the transverse limb 42 facing the rotor 3 and the radially outer boundary surface 49 of the coil core 4 are each configured as planar surface, i.e. not curved. This variant can be produced by stacking a plurality of identical elements 48, each of which is L-shaped, congruently on one another and then adhesively bonding or molding them together for fixing.

Figure 7:
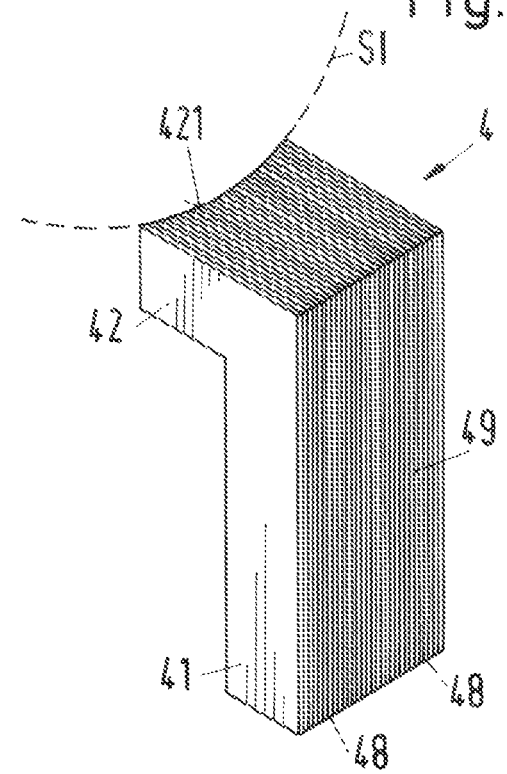
Figure 8:
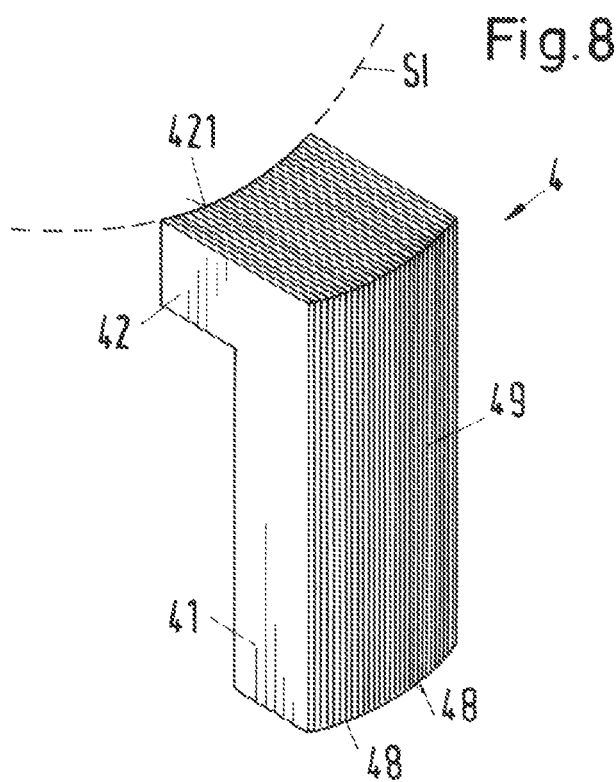

In the variant shown in FIG. 7 that corresponds to the coil core 4, which is shown in FIGS. 3 to 5 for the second embodiment, the end face 421 of the transverse limbs 42 of the coil cores 4 is curved as a segment of a circular cylinder, which is coaxial with the rotor 3. The radially outer boundary surface 49 of the coil core 4 is configured as planar surface, i.e. it is not curved.

In FIG. 7, the inner circle along which the end face 421 of the transverse limb 42 extends, is indicated by the circle having the reference sign SI. This circle SI is concentric with the disk-shaped magnetically effective core 31 of the rotor, i.e. the center of the circle SI lies on the desired axis of rotation of the rotor 3. Thus, the curvature of the end face 421 follows the curvature of the outer surface of the magnetically effective core 31 of the rotor 3.

For the production of the variant shown in FIG. 7, for example, the variant shown in FIG. 6 can be assumed. Then the planar end face 421 of the variant from FIG. 6 is machined by cutting, e.g. milling, so that the curved end face 421 of the variant from FIG. 7 results. In the variant shown in FIG. 8, both the end face 421 of the transverse limb 42 facing the rotor 3 and the radially outer boundary surface 49 of the coil core 4 are each curved as a segment of a circular cylinder, which is coaxial with the rotor 3.

Such a configuration can be realized, for example, in that the individual and identical elements 48 are successively slightly displaced with respect to one another with respect to the radial direction to achieve or to approach the curvature of the end face 421 and the curvature of the outer boundary surface 49 of the coil core 4. For this purpose, the individual elements 48 are each displaced with respect to one another in the radial direction such that their ends forming the end face 421 follow the contour of the inner circle SI.

In the following, different variants for the configuration of the rotor 3, more exactly for the configuration of the magnetically effective core 31 of the rotor 3, will now be explained, with reference to FIGS. 9 to 21. The rotor 3 is configured as coil-free and free of permanent magnets as a reluctance rotor. As already mentioned, the components of the magnetically effective core 31 of the rotor that consist of the ferromagnetic material F are produced from a soft magnetic material, for example from iron, nickel iron or silicon iron. In this respect, these parts consisting of the ferromagnetic material F, i.e. the bar-shaped ferromagnetic elements 32, for example, can be manufactured by casting, stamping, pressing of soft magnetic powder with subsequent sintering, forging, shaping or assembling of parts such as metal sheets. The parts of the magnetically effective core 31 of the rotor 3 consisting of the ferromagnetic material F can therefore in particular also be made of sheet metal, in an analog manner such as explained with respect to the coil cores 4, that is from a plurality of thin elements that are then stacked in parallel with one another and that are, for example, fixed by a plastic jacket or by a molding in plastic (see FIG. 22 and FIG. 23).

In addition to the parts made of the ferromagnetic material F, the magnetically effective core 31 also comprises portions or regions made of the low-permeable material N which each form a flux barrier. The low-permeable material can be air, for example, or a plastic or a paramagnetic metal or a diamagnetic metal, or also combinations of these materials. Several different low-permeable materials N can also be provided in the magnetically effective core 31.

For reasons of better clarity, only those portions of the magnetically effective core 31 of the rotor 3 which consist of the ferromagnetic material F are shown explicitly in FIGS. 9 to 23, i.e. the bar-shaped ferromagnetic elements 32, for example. Those regions of the magnetically effective core 31 which include the low-permeable material N are each represented by voids. The representations in FIGS. 9 to 23 are therefore to be understood that all those regions of the magnetically effective core 31 which are not occupied by the portions consisting of the ferromagnetic material F and which supplement the magnetic core 31 to form a complete circular disk, include the low-permeability material N.

In all the variants represented in FIGS. 9 to 21, the particularly preferred embodiment is realized, which has already been explained in connection with FIG. 2. According to this particularly preferred embodiment, the magnetically effective core 31 of the rotor 3 has a plurality of bar-shaped ferromagnetic elements 32, which each extend perpendicularly to the axial direction A and which are arranged parallel and spaced apart to each other. The ferromagnetic elements 32 include the ferromagnetic material F. Each of the bar-shaped ferromagnetic elements 32 is thus arranged in the magnetic rotor plane C, wherein all bar-shaped ferromagnetic elements 32 extend parallel to each other in the preferential magnetic direction M. In the transverse direction Q, a distance D (FIG. 9) is respectively provided between two adjacent ferromagnetic elements 32. The space between two adjacent bar-shaped ferromagnetic elements 32 is respectively filled with the low-permeable material N, which thus respectively forms a flux barrier between adjacent ferromagnetic elements 32.

Preferably, each bar-shaped ferromagnetic element 32 is configured such that it substantially forms a secant with respect to the circular surface of the disk-shaped magnetically effective core 31 of the rotor 3, i.e. each ferromagnetic element 32 extends completely through the magnetically effective core 31 of the rotor 3 with respect to the preferential magnetic direction M. With respect to the axial direction A, each ferromagnetic element 32 has an extension, which corresponds at least substantially to the axial height HR (see FIG. 4) of the magnetically effective core 31. The width of the ferromagnetic elements 32, i.e. their (maximum) extension in the transverse direction Q, can be the same for all ferromagnetic elements 32. It is also possible that the two outwardly situated ferromagnetic elements 32—for geometrical reasons—each have a different width, in particular a smaller width, than the other ferromagnetic elements 32. Furthermore, the bar-shaped ferromagnetic elements 32 are preferably distributed equidistantly over the magnetically effective core 31, i.e. the distance D (FIG. 9) between two adjacent ferromagnetic elements 32 in the transverse direction Q is the same for all pairs of adjacent ferromagnetic elements 32.

In the variants represented in FIGS. 9 to 13, the degree of filling is about 50% in each case, i.e. the magnetically effective core 31 consists of about 50% of the ferromagnetic material F and about 50% of the low-permeable material N. This can be achieved, for example, that the distance D between two adjacent bar-shaped ferromagnetic elements 32 is selected to be the same as the width of the bar-shaped ferromagnetic elements 32 in the transverse direction Q.

FIG. 9 shows a variant in which five bar-shaped ferromagnetic elements 32 are provided.

Figure 10:
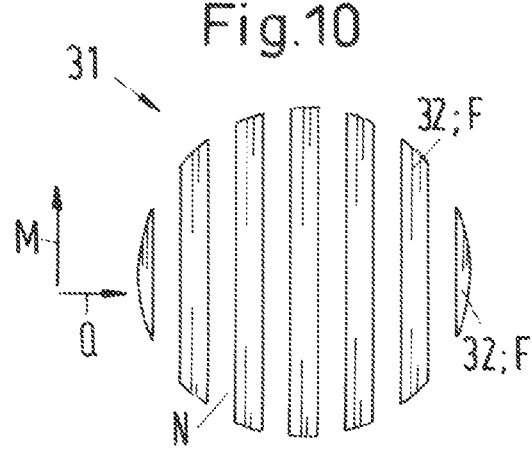

FIG. 10 shows a variant in which seven bar-shaped ferromagnetic elements 32 are provided, wherein the magnetically effective core 31, viewed in the transverse direction Q, begins with a bar-shaped ferromagnetic element 32 and ends with a bar-shaped ferromagnetic element 32.

Figure 11:
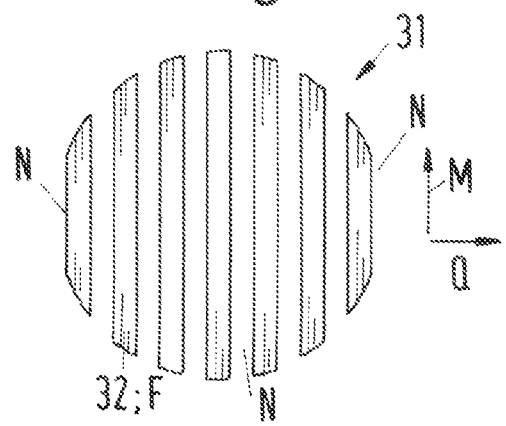

FIG. 11 shows a variant in which seven bar-shaped ferromagnetic elements 32 are provided, wherein the magnetically effective core 31, viewed in the transverse direction Q, begins with a flux barrier consisting of the low-permeable material N and ends with a flux barrier consisting of the low-permeable material N.

Figure 12:
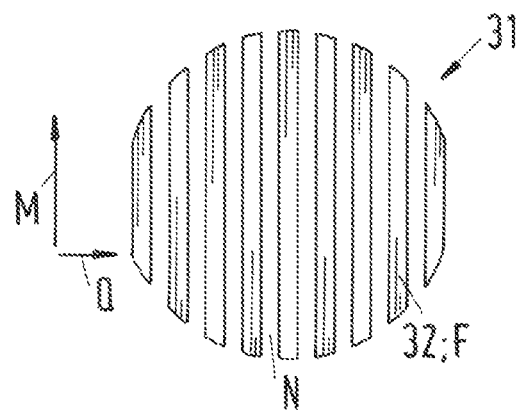
Figure 13:
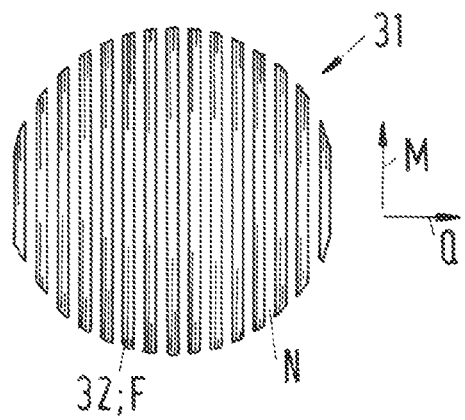

FIG. 12 shows a variant in which nine bar-shaped ferromagnetic elements 32 are provided FIG. 13 shows a variant in which fifteen bar-shaped ferromagnetic elements 32 are provided.

Figure 14:
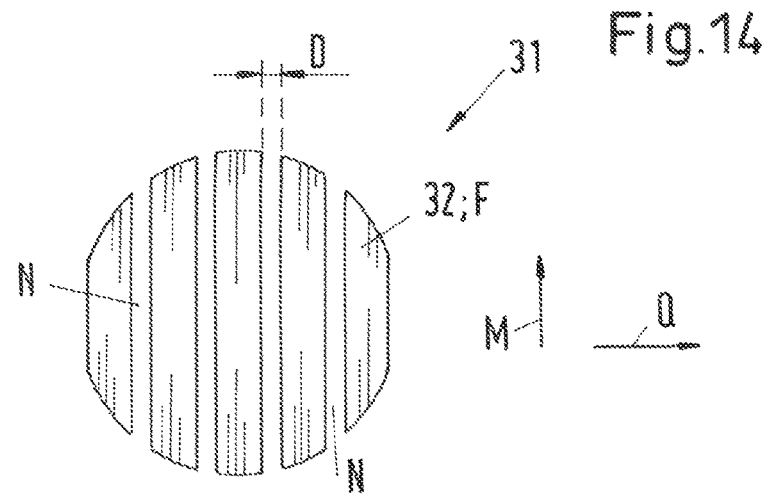

FIG. 14 shows a variant in which the degree of filling is about 70%, i.e. the magnetically effective core 31 of the rotor 3 consists of about 70% of the ferromagnetic material F and about 30% of the low-permeable material N. This can be achieved, for example, that the distance D between two adjacent bar-shaped ferromagnetic elements 32 is selected to be correspondingly smaller than the width of the bar-shaped ferromagnetic elements 32 in the transverse direction Q.

FIGS. 15 to 18 show variants in which the magnetically active core 31 respectively has a plurality of transverse webs 33, each connecting two adjacent bar-shaped ferromagnetic elements 32. Preferably, these transverse webs 33 are also made of the ferromagnetic material F, so that they can be manufactured together with the bar-shaped ferromagnetic elements 32. The transverse webs 33 are geometrically configured and dimensioned such that they only insignificantly influence, if at all, the magnetic anisotropy of the magnetically effective core 31. This can be achieved, for example, by making the transverse webs 33 much thinner than the bar-shaped ferromagnetic elements 32. Preferably, the cross-sectional area perpendicular to the longitudinal extension of each transverse web 33 is at least a factor of 4, preferably at least a factor of 9, smaller than the corresponding cross-sectional area of the bar-shaped ferromagnetic elements. This causes the transverse webs 33 to saturate magnetically practically immediately in the operating state, i.e. they reach the range of saturation magnetization, so that they no longer make a significant contribution to magnetic flux conduction and thus change the magnetic anisotropy of the magnetically effective core only insignificantly.

Of course, it is also possible that the transverse webs 33 include a material other than the ferromagnetic material F, for example a plastic or a low-permeable metal.

The transverse webs 33 mainly serve to increase the mechanical stability of the magnetically effective core 31 of the rotor 3.

In the variants shown in FIGS. 15 to 18, five bar-shaped ferromagnetic elements 32 respectively are provided with an exemplary character. The degree of filling is about 50%.

Figure 15:
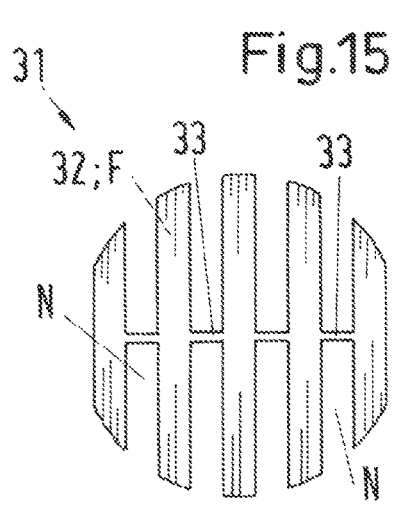
Figure 16:
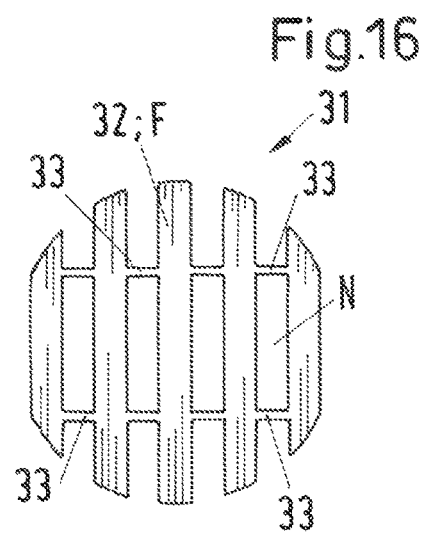
Figure 17:
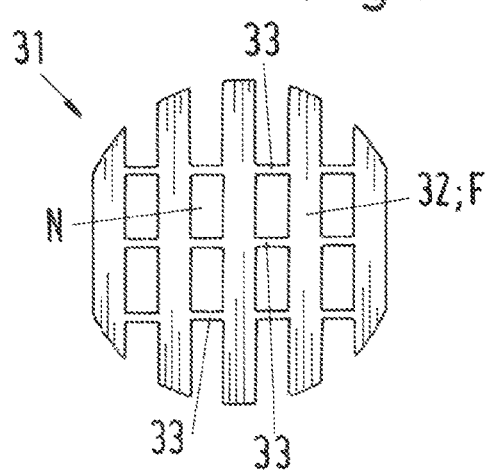

In the variants shown in FIGS. 15 to 17, the transverse webs 33 are arranged on the inside.

FIG. 15 shows a variant, in which exactly one transverse web 33 respectively is disposed between two adjacent bar-shaped ferromagnetic elements 32, the transverse web 33 respectively extending in the transverse direction Q. All transverse webs 33 are aligned with each other along the diameter of the magnetically effective core 32—i.e. centrally.

FIG. 16 shows a variant in which exactly two transverse webs 33 are disposed between two adjacent bar-shaped ferromagnetic elements 32, the transverse webs 33 respectively extending in the transverse direction Q. The two transverse webs 33, which connect the same ferromagnetic elements 32 with each other, are arranged symmetrically with respect to the diameter of the magnetically effective core 31.

FIG. 17 shows a variant in which exactly three transverse webs 33 are disposed between two adjacent bar-shaped ferromagnetic elements 32, the transverse webs 33 respectively extending in the transverse direction Q. One of the three transverse webs 33 connecting the same ferromagnetic elements 32 is arranged along the diameter of the magnetically active core 31 and the other two transverse webs 33 are arranged symmetrically with respect to the diameter of the magnetically active core 31.

Figure 18:
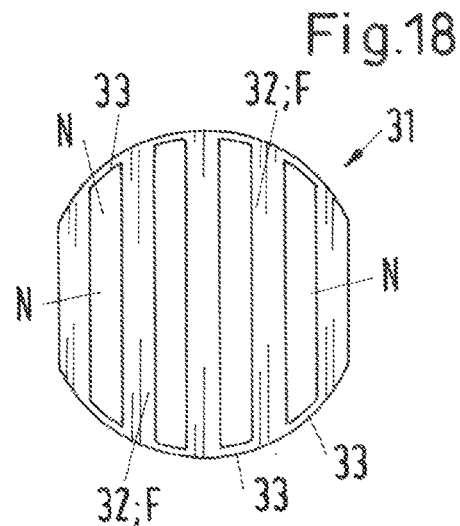

FIG. 18 shows a variant in which the transverse webs 33 are arranged radially outward. Exactly two transverse webs 33 respectively are disposed between two adjacent bar-shaped ferromagnetic elements 32, each of the transverse webs 33 connecting one of the two radially outer ends of the adjacent ferromagnetic elements 32. In this configuration, the transverse webs 33 are each curved and respectively extend in the peripheral direction of the magnetically effective core 31. The transverse webs 33 thus extend along the periphery of the magnetically effective core 31.

Figure 19:
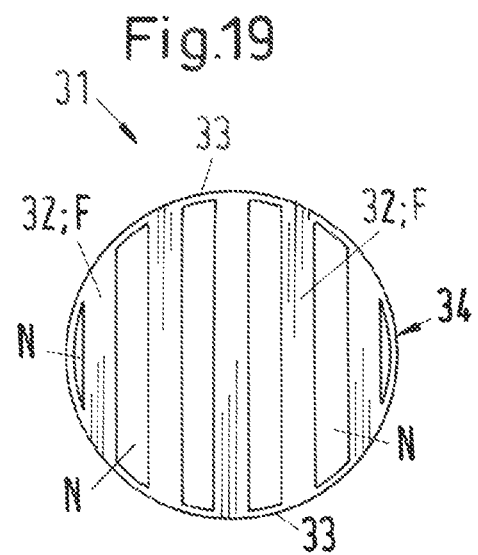

FIG. 19 shows a variant, which is very similar to the variant shown in FIG. 18. However, with the variant according to FIG. 19, the transverse webs 33 are supplemented to a complete ring 34, which extends along the total periphery of the magnetically effective core 31 and forms a radially outer boundary surface of the magnetically effective core 31. Thus, the magnetically effective core 31 of rotor 3 has the radially outwardly disposed ring 34, which surrounds all bar-shaped ferromagnetic elements 32.

Figure 20:
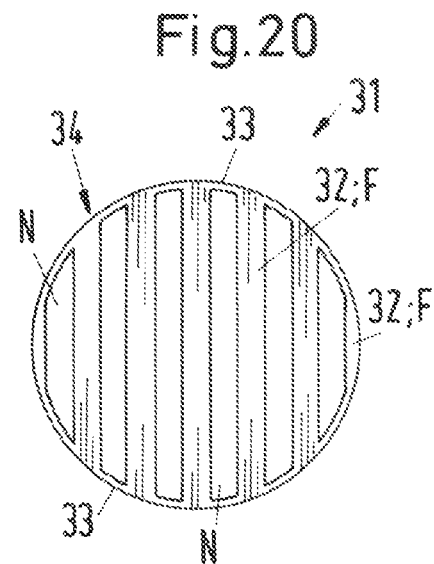

FIG. 20 shows a variant, which is very similar to the variant shown in FIG. 19 and which has also the radially outwardly disposed ring 34. However, in the variant shown in FIG. 20, the bar-shaped ferromagnetic elements 32 are configured and arranged in the same way as in the variant shown in FIG. 10.

Figure 21:
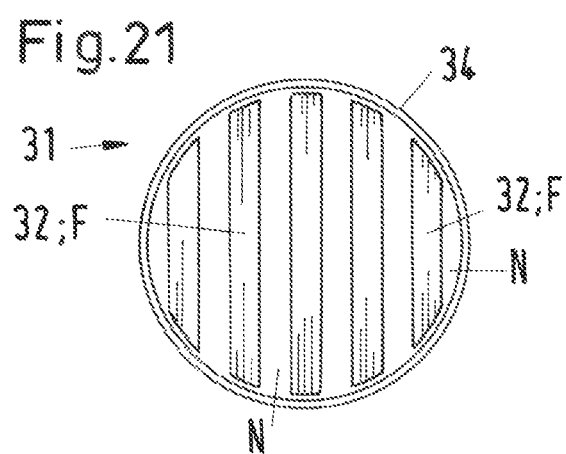

FIG. 21 shows a variant, which is similar to the variant shown in FIG. 9. However, the variant according to FIG. 21 also has the radially outwardly disposed ring 34. This ring 34, however, is manufactured from an electrically conductive material, which is different from the ferromagnetic material F. Here, the ring 34 is made, for example, of a non-ferromagnetic metal with good electrical conductivity, e.g. aluminum, stainless steel or copper.

The sensor system with which the radial position of the rotor 3 and/or its rotary position is determined, and which is required for the control and regulation of the rotor position can be simplified by the radially outwardly disposed ring. The radially outwardly disposed ring 34, regardless of whether it is made of the ferromagnetic material F or of a different electrically conductive material, extends over the total periphery of the magnetically effective core 31 and bounds it with respect to the radial direction. The ring 34 therefore forms the radially outer boundary surface of the magnetically effective core 31. It is ensured by the radially outwardly disposed ring 34 that the desired spacing of the magnetically effective core 31 of the rotor 3 from the end faces 421 of the coil cores 4 of the stator 2 is a constant value viewed over the total periphery of the magnetic core 31. The desired spacing is in this respect the radial spacing between the rotor 3 and the transverse limbs 42 of the coil cores 4, when the rotor 3 is in the centered and non-tilted position in the radial plane. The constancy of the desired spacing over the peripheral direction of the rotor 3—that is along the ring 34—in particular allows a simpler metrological detection of the radial position of the rotor 3 in the operating state because the desired spacing of the magnetic core 31 is of an equal amount and is constant for all coil cores 4 independently of the current angular position of the rotor 3.

Figure 22:
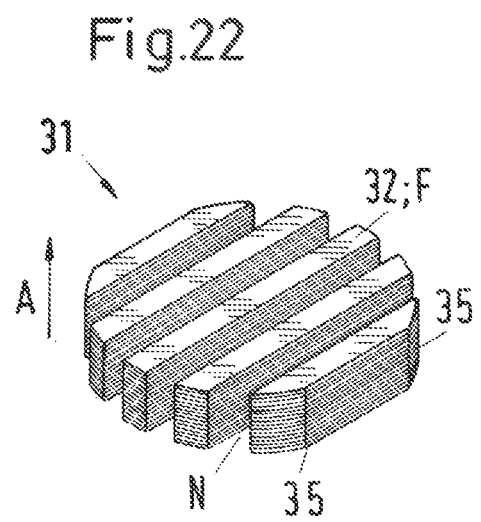
FIG. 22-23 are different embodiments of the rotor, in which the magnetically effective core is made of sheet metal, each in a perspective representation.
Figure 23:
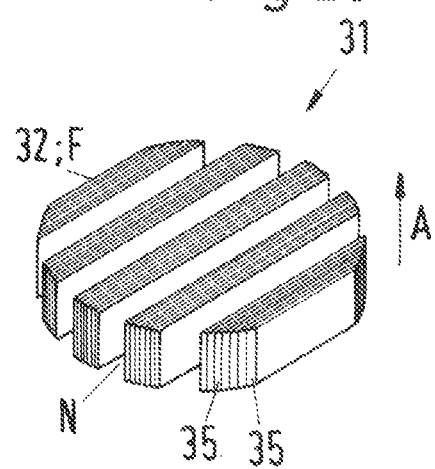

Those portions of the magnetically effective core 31 including the ferromagnetic material F, i.e. in particular the bar-shaped ferromagnetic elements 32 and/or the transverse webs 33 (if present), are preferably made of metal sheet from a plurality of rotor elements 35, which are stacked in the axial direction A or in the radial direction. This is illustrated in FIG. 22 and FIG. 23 as an example with reference to the variant represented in FIG. 14. FIG. 22 shows an embodiment in which the rotor elements 35 are stacked in the axial direction A. FIG. 23 shows an embodiment in which the rotor elements 35 are stacked in the radial direction. It is naturally understood that this embodiment in sheet metal configuration can also be used for all other variants of the magnetically effective core 32 in the analogously same manner. For most applications, stacking the rotor elements 35 in the axial direction A, i.e. according to FIG. 22, is preferred.

It is understood that many other variants are possible for the configuration of the magnetically effective core 31 of the rotor 3, for example by combining the variants described or by varying the number of bar-shaped ferromagnetic elements 32 or their geometric shape, or by varying the number and/or the arrangement of the transverse webs 33.

Embodiments of the position sensor system and arrangements of the position sensors will now be explained in the following, which can be used for both the first embodiment (FIG. 2) and the second embodiment (FIGS. 3 to 5).

The radial rotor position and the angle position of the rotor 3 must be known or must be metrologically determined for the regulation and for the control of a bearingless motor and thus also for the specific configuration as a temple motor 1. In this respect, the radial rotor position means the radial position of the rotor 3 in the radial plane. The radial plane is that plane in which the rotor 3 is magnetically levitated in the operating state. If the rotor 3 is free of tilts, the radial plane coincides with the magnetic rotor plane C. The angle position of the rotor 3 indicates the relative angle of rotation of the rotor 3 with respect to the stator 2 on its rotation about the axial direction A. This angle of rotation, which is also known as the rotor angle, can be determined, for example, in that an x axis of any desired orientation and a y axis perpendicular thereto are fixed in the x-y plane, that is in the radial plane, the axes being in a fixed position with respect to the stator 2. The instantaneous angle of rotation of the rotor 3—and thus the angle position of the rotor 3—can then be determined as an instantaneous angle with respect to this x axis (or naturally also to the y axis).

If the ferromagnetic rotor 3 is magnetized by additionally generating a stator current by the coils 61, which stator current does not generate a torque, and which rotates with the rotor 3, the angle of rotation of the rotor 3 can always be determined from this rotating stator current.

Figure 24:
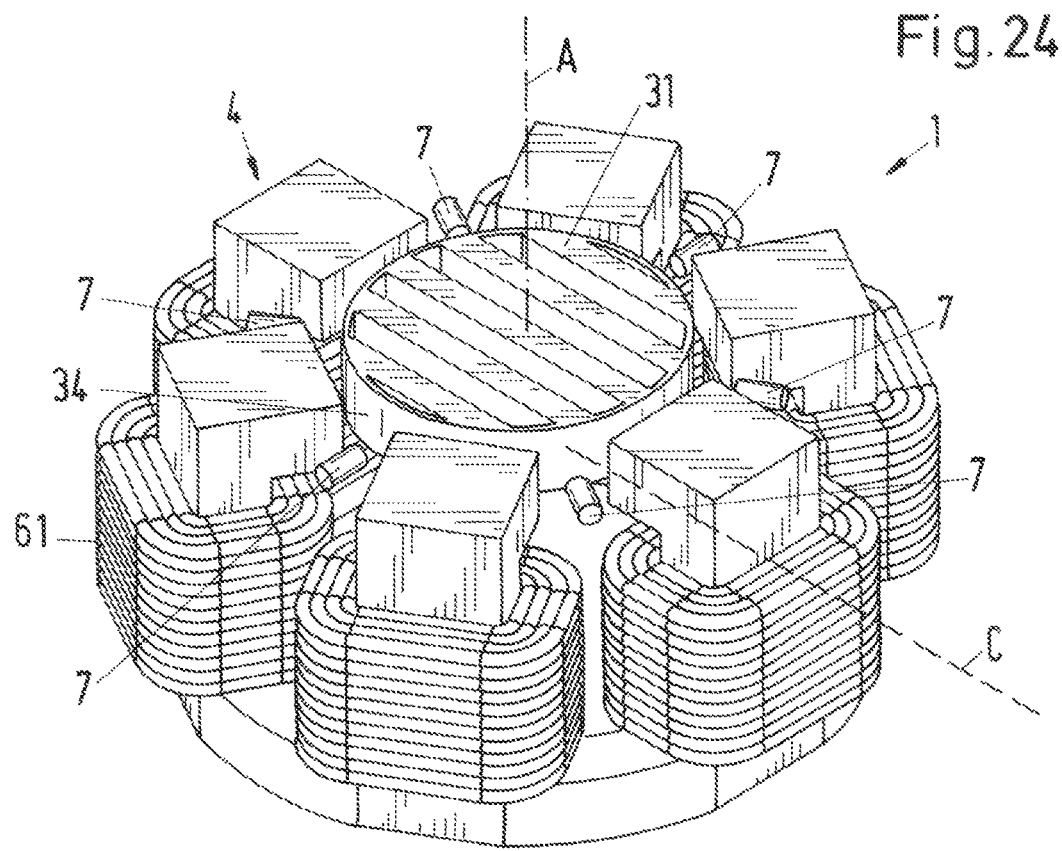
FIG. 24-27 are different variants for the arrangement of sensors, each in a perspective representation.

FIG. 24 shows in a perspective representation the stator according to FIG. 2 in combination with the magnetically effective core 31 of the rotor 3 according to the variant of FIG. 19, in which the radially outwardly disposed ring 34 is provided, which includes the ferromagnetic material F.

Furthermore, a total of six position sensors 7 are shown in FIG. 24 by which the radial rotor position—that is its position in the radial plane or in the x-y plane—can be determined. The position sensors 7 are preferably eddy current sensors. The position sensors 7 can also be configured as optical sensors, as capacitive sensors or as magnetic field sensors, for example as Hall sensors or as GMR sensors. The position sensors 7 are in signal communication with a control and regulation device, not shown, via signal lines, not shown.

It is a common and well-known measure to provide a total of four position sensors 7 to determine the position of the rotor 3 in the radial plane. In this respect, the position sensors 7 are disposed diametrically opposite pair-wise. In principle, two position sensors 7 are sufficient to determine the position of the rotor 3 in the x-y plane, namely one per coordinate direction. It is, however, preferred to provide at least four position sensors 7 in order thus to allow a more accurate determination of the position of the rotor 3 from the difference signal of the position sensors 7 oppositely disposed pair-wise. In the sensor arrangement represented in FIG. 24, a total of six position sensors 7 are provided that are diametrically opposed pair-wise to determine the position of the rotor 3 even more precisely. The position sensors 7 are all arranged in the radial plane in which the rotor 3 is levitated, that is in its magnetic center plane C in the non-tilted state of the rotor 3. Thus, the position sensors 7 are all arranged centrally with respect to the axial direction A with respect to the magnetically effective core 32. The position sensors 7 are distributed equidistantly over the peripheral direction. A position sensor 7 is respectively arranged between the transverse limbs 42 of two adjacent coil cores 4. The ring 34, which forms the radially outer boundary surface of the magnetically effective core 31, serves as a measuring surface for the position sensors 7.

Figure 25:
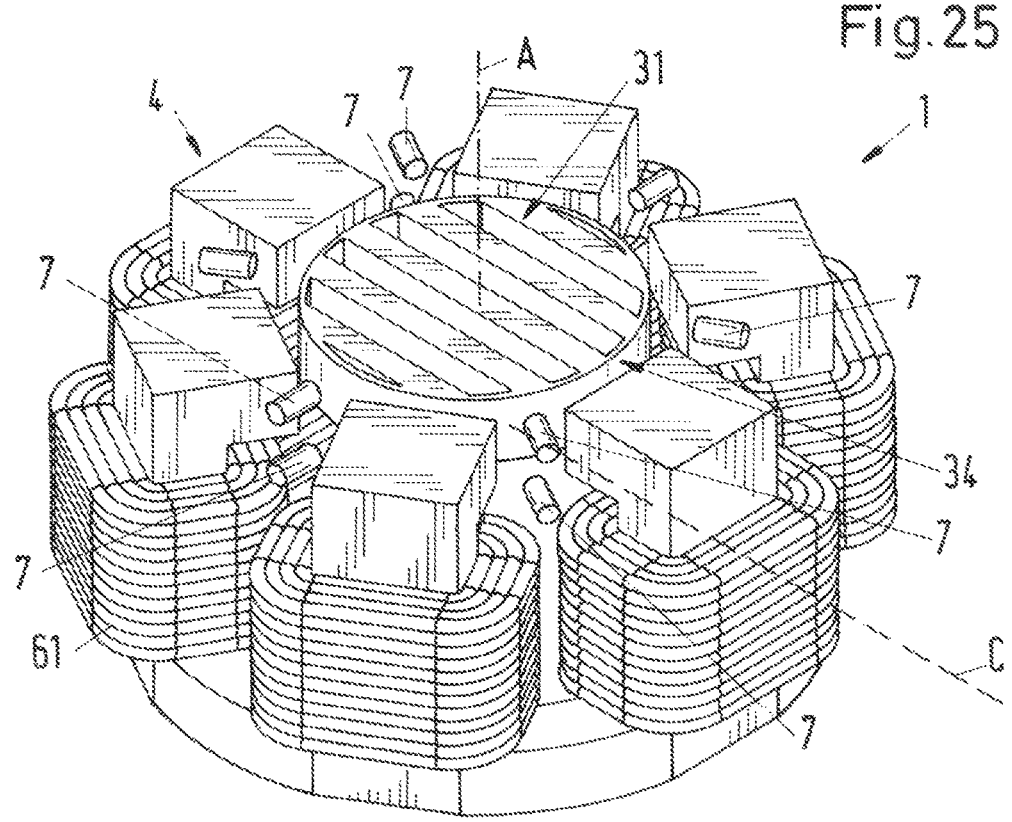

A further variant for the arrangement of the position sensors 7 is shown in a perspective representation in FIG. 25. In the arrangement represented in FIG. 25, a total of twelve position sensors are provided, which are arranged to be diametrically opposed pair-wise and which are distributed equidistantly over the peripheral direction. Two position sensors 7 are respectively disposed between two adjacent coil cores 4, which position sensors 7 are arranged one above the other with respect to the axial direction A. In this respect, the upper of the two position sensors according to the representation is respectively arranged with respect to the axial direction A such that it faces the top edge, according to the representation, of the magnetically effective core 31 and the lower of the two position sensors according to the representation is arranged with respect to the axial direction A such that it faces the lower edge, according to the representation, of the magnetically effective core 31. This sensor arrangement has the advantage that, in addition to the radial position of the rotor 3, the axial position of the rotor 3, i.e. its position with respect to the axial direction A, and tilts of the rotor 3 with respect to the radial plane can also be determined.

Figure 26:
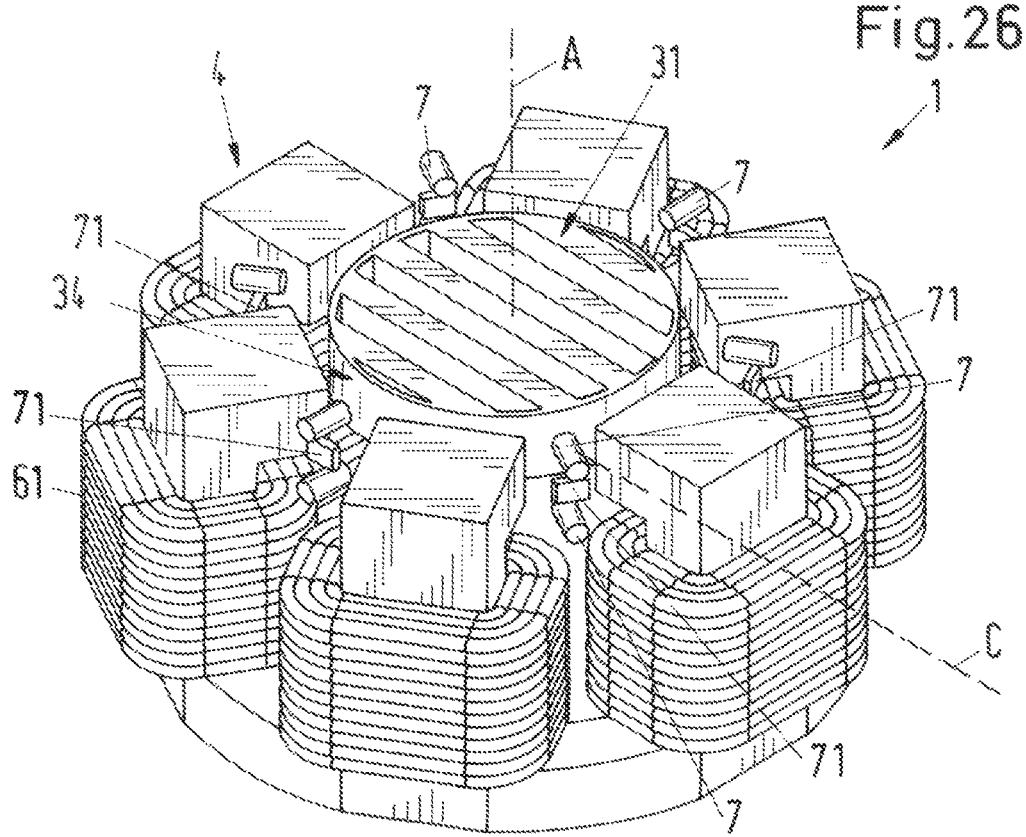

FIG. 26 shows a sensor arrangement which essentially corresponds to that shown in FIG. 25. However, in the arrangement according to FIG. 26, six magnetic field sensors 71 are additionally provided as angle sensors, which are designed as Hall sensors or GMR sensors, for example. In each case between two position sensors 7, which are arranged between the same coil cores 4, one of the six magnetic field sensors 71 is arranged, preferably in the middle (with respect to the axial direction A) between these two position sensors 7. With the magnetic field sensors 71, the angle of rotation of the rotor 3 (rotor angle) can additionally be determined.

Figure 27:
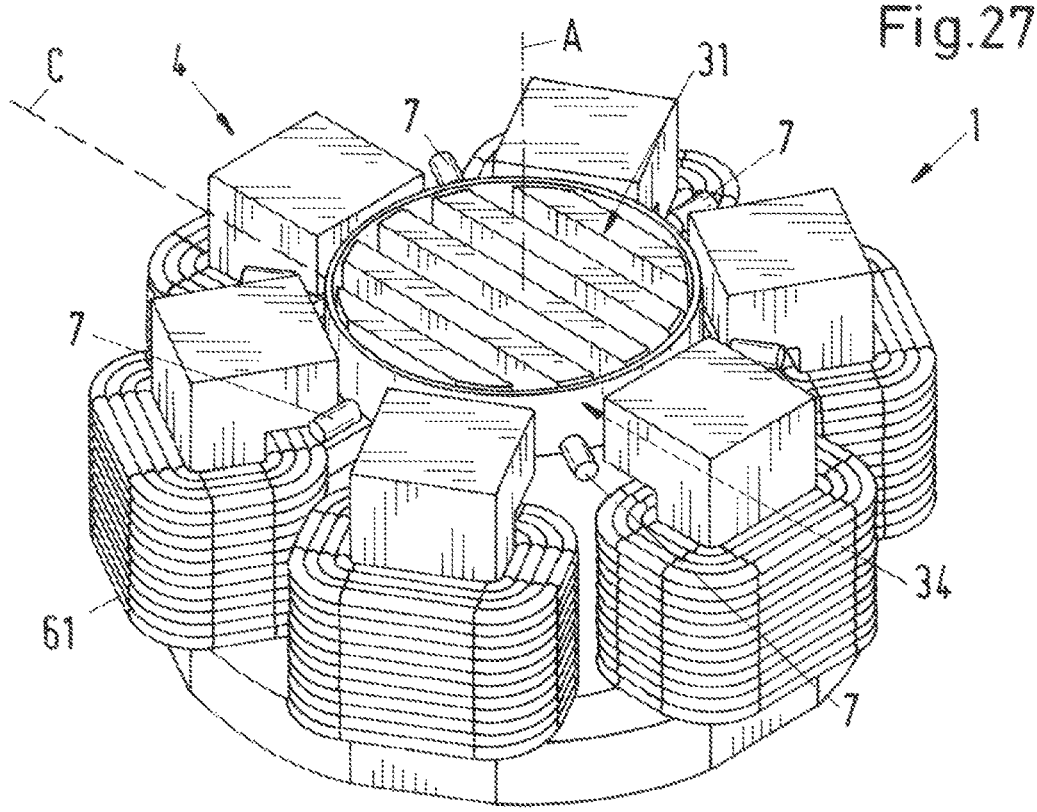

FIGS. 24 to 26 respectively show the magnetically effective core 31 according to the variant from FIG. 19, in which the radially outwardly disposed ring 34 consists of the ferromagnetic material F. Of course, it is also possible for all three sensor arrangements described that the magnetically effective core 31 is configured according to the variant from FIG. 21, in which the ring 34 is made of an electrically conductive material, which is different from the ferromagnetic material F. Such an embodiment with the magnetically effective core 31, which is configured according to the variant from FIG. 21, is shown in FIG. 27 as an example using the sensor arrangement according to FIG. 24.

A rotational device for conveying, pumping, mixing or stirring fluids is further proposed by the invention, which is characterized in that the rotational device comprises an electromagnetic rotary drive 1 that is configured according to the invention, wherein the rotor 3 of the rotary drive 1 is configured as rotor 3 of the rotational device. The above explanations with respect to the electromagnetic rotary drive 1 also apply in the same manner or in accordingly the same manner to the rotational machine according to the invention. The reference signs in particular have the same meaning as has already been explained in connection with the embodiments described above.

Figure 28:
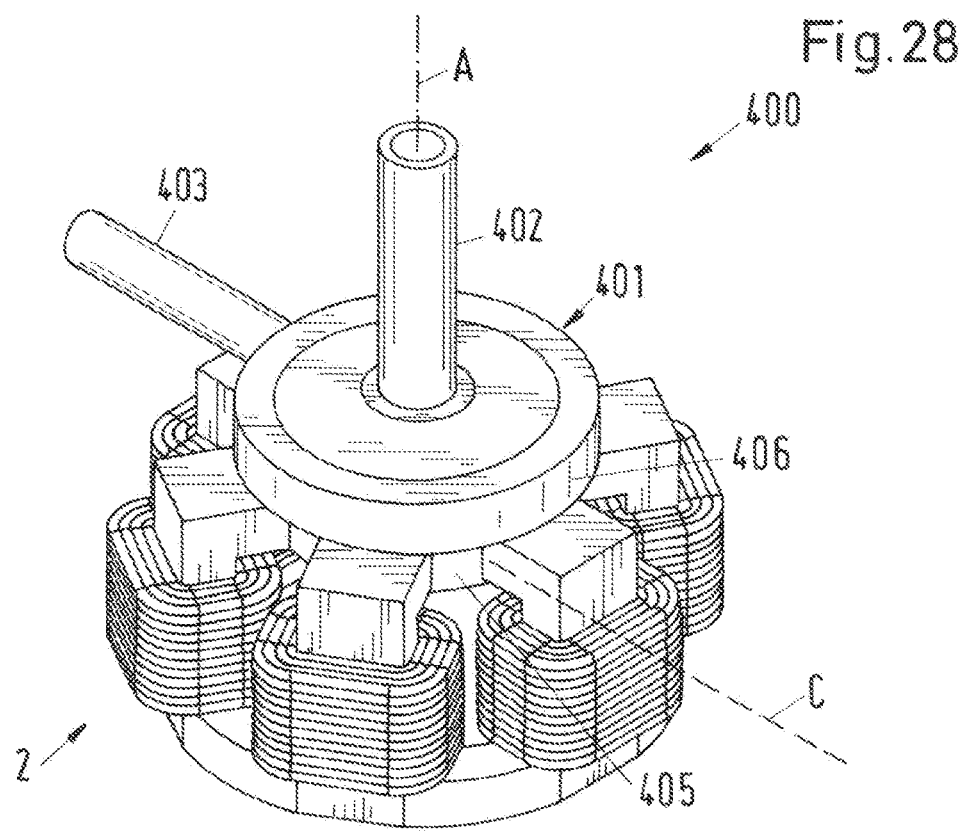
FIG. 28 is a perspective representation of an embodiment of a rotational device according to the invention, which is configured as a pumping device.
Figure 29:
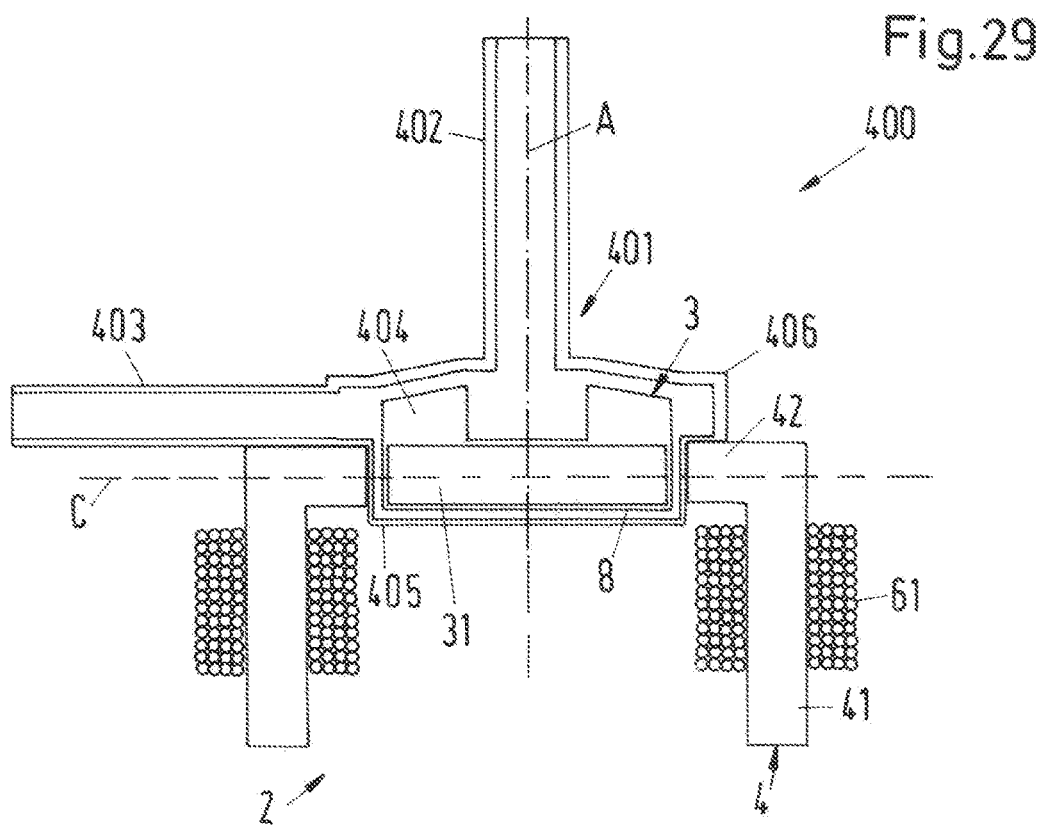
FIG. 29 is a schematic section through the embodiment of FIG. 28 in the axial direction.

FIG. 28 shows in a perspective representation an embodiment of a rotational device according to the invention, which is configured as a pumping device and in particular as a centrifugal pump. The pumping device is designated as a whole with the reference sign 400. For better understanding, FIG. 29 shows a schematic sectional view of the pumping device 400 in a section in the axial direction A.

The pumping device 400 is configured for pumping and conveying a fluid and comprises the stator 2, which for example is configured as explained in connection with FIG. 2 and FIG. 3.

The pumping device 400 further comprises a pump housing 401 that is preferably manufactured from a plastic. The pump housing 401 has an inlet 402 for the fluid to be conveyed that extends in the axial direction A, that is arranged centrally at the middle of the pump housing 401 and that is configured as a cylindrical tube in the axial direction A and has an outlet 403 for the fluid to be conveyed that extends in the radial direction and that is configured as a cylindrical tube. The rotor 3 that is configured as a pump rotor and that comprises the magnetically effective core 31 and a plurality of vanes 404 to convey the fluid from the inlet 402 to the outlet 403 is provided in the pump housing 401. The vanes 404 are arranged above the magnetically effective core 31 according to the illustration with respect to the axial direction A and preferably extend in the radial direction. The pumping device 400 is here therefore configured as a centrifugal pump. Other configurations, e.g. as an axial pump or as a helico-axial pump, are naturally also possible.

Figure 30:
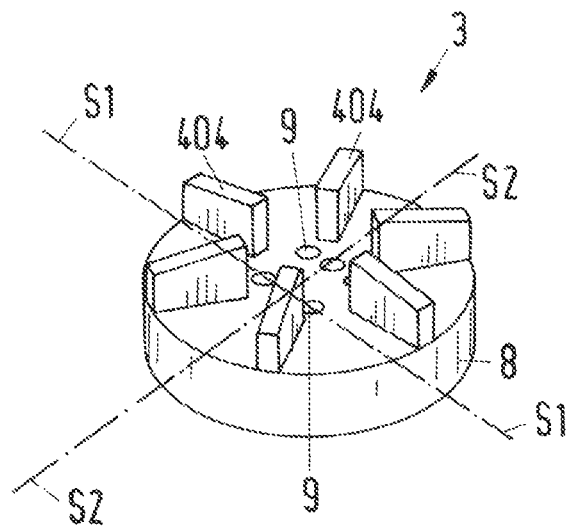
FIG. 30 is a perspective representation of the rotor of the embodiment of FIG. 28.
Figure 31:
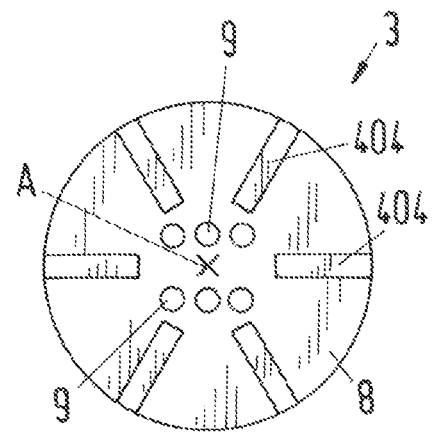
FIG. 31 is a plan view of the rotor of FIG. 30.

For better understanding, the rotor 3, configured as a pump rotor, is shown once more in FIGS. 30 and 31. FIG. 30 shows a perspective representation of the rotor 3 of the pumping device 400, and FIG. 31 shows a plan view of the rotor 3 from the axial direction.

It is an advantageous aspect that the rotor 3 is configured as an integral rotor because it is both the rotor 3 of the electromagnetic drive 1 and the rotor 3 of the pumping device 400 by which the fluid to be conveyed is pumped. The rotor 3 thus fulfills three functions in one: it is the rotor of the electromagnetic drive, it is the rotor of the magnetic levitation, and it is the pump rotor or impeller with which the fluid is conveyed. This configuration as an integral rotor offers the advantage of a very compact and space-saving design.

The magnetically effective core 31 of the rotor 3 is surrounded by a jacket 8, which, exactly like the vanes 404, is preferably manufactured of plastic. The jacket 8 preferably completely surrounds the magnetic core 31 of the rotor 3, so that the magnetically effective core 31 is encapsulated by the jacket 8. The vanes 404 can be configured in one piece with the jacket 8. But it is also possible to manufacture an impeller with the vanes 404 as a separate component, preferably of plastic, and then firmly connect this impeller to the jacket 8, for example by welding or adhesive bonding.

The pump housing 401 comprises a lower portion 405 that surrounds the magnetically effective core 31 of the rotor 3 and comprises an upper portion 406 that is axially adjacent thereto and that surrounds the vanes 404 of the rotor. Both portions 405 and 406 have a substantially circular cross-sectional surface perpendicular to the axial direction, with the lower portion 405 having a smaller diameter than the upper portion 406. The diameter of the lower portion 405 is dimensioned in this respect such that it can be inserted between the transverse limbs 42 of the coil cores 4 with as small a clearance as possible and can be released from the stator 2 again in a simple manner. The diameter of the upper portion 406 is dimensioned such that it overlaps the transverse limbs 42 with respect to the radial direction such that it can lie on the transverse limbs 42.

When the pump housing 401 having the rotor 3 arranged therein is inserted into the stator 2, the transverse limbs 42 of the coil cores 4 surround the lower portion 405 of the pump housing 401 in which the magnetically effective core 31 is located such that the magnetic rotor plane C is disposed in the radial plane and the magnetically effective core 31 lies completely between the end faces 421 of the transverse limbs 42 with respect to the axial direction A. In the operating state, the magnetically effective core 31 is then centered both with respect to the axial direction A and with respect to its radial position between the end faces 421 of the transverse legs 42. The rotor 3 is thus contactlessly magnetically drivable and contactles sly magnetically levitatable with respect to the stator 2 in the operating state.

The upper portion 406 of the pump housing 401 is located directly above the transverse limbs 42 of the coil cores 4 with respect to the axial direction A. The outlet 403 that opens into this upper portion 406 is disposed at the same height as the vanes 404 with respect to the axial direction A, which is in particular advantageous with respect to the hydrodynamic forces that act on the rotor 3 in operation. For these hydrodynamic forces distribute as evenly as possible over the rotor 3. Such a relative arrangement between the outlet 403 and the vanes 404 is in particular possible by the configuration of the rotary drive 1 as a temple motor because here the transverse limbs 42 are free of windings that would make such an arrangement of the outlet 403 at least considerably more difficult.

In order, in particular, to relieve the axial magnetic levitation of the rotor 3, it is advantageous if the rotor 3 configured as a pump rotor has a plurality of relief channels 9 which each extend in the axial direction through the magnetically effective core 31 of the rotor 3.

Figure 32:
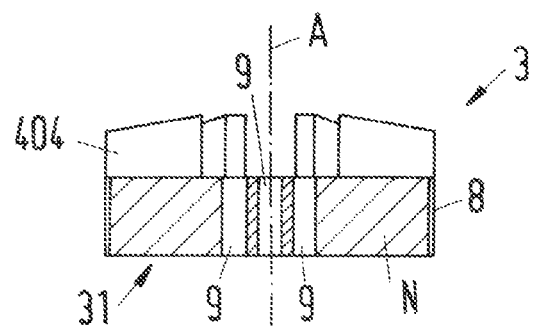
FIG. 32 is a schematic section through the rotor of FIG. 30 in an axial direction along the section line S1-S1 in FIG. 30.
Figure 33:
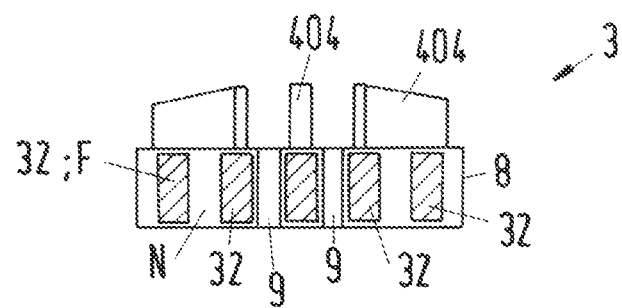
FIG. 33 is a schematic section through the rotor of FIG. 30 in an axial direction along the section line S2-S2 in FIG. 30.

For better understanding, FIGS. 32 and 33 show two schematic sectional representations of the rotor 3 from FIG. 30. FIG. 32 shows a section in the axial direction along the section line S1-S1 in FIG. 30. FIG. 33 shows a section in the axial direction along the section line S2-S2 in FIG. 30

In the embodiment of the rotor 3 shown here, a total of six relief channels 9 are provided, all of which are arranged in a central region of the rotor 3 which is bounded by the radially inwardly disposed ends of the vanes 404 (see in particular FIG. 31). Naturally it is also possible to provide less, e.g. four, or even more, e.g. eight, relief channels 9 within the rotor 3.

In order to influence the magnetic properties and in particular the magnetic anisotropy of the magnetically effective core 31 as little as possible, all relief channels 9 are arranged in such a way that they extend in the magnetically effective core 31 only through the flux barriers consisting of the low-permeable material N, but not through the regions consisting of the ferromagnetic material F, i.e. in particular not through the bar-shaped ferromagnetic elements 32. That is, the ferromagnetic material F of the magnetically active core 31, i.e. in particular the bar-shaped ferromagnetic elements 32, is preferably completely free of the relief channels 9.

In the operating state, the fluid can flow through the relief channels 9, which results in at least partial compensation of the axial thrust, which is exerted on the rotor 3. This significantly relieves the magnetic axial levitation of the rotor 3 in particular.

It is understood that the rotary device according to the invention can also be configured in accordingly the same manner as a mixing device for mixing several substances, for example for mixing several liquids, for mixing suspensions or other flowable substances or also as a stirring device. The rotary device according to the invention can in particular very generally be a pumping or mixing device with which media or substances are mixed. These substances can in particular be fluids or solids, preferably powders. Such pumping or mixing device are suitable for mixing liquids among one another and/or for mixing at least one liquid with a powder or other solid and/or for mixing gases with liquids and/or solids.

The rotational device according to the invention, such as the pumping device 400, can also be configured in an advantageous manner with components for single use and then typically comprises a single-use device configured for single use that can therefore be used only once according to their intended purpose and then have to be replaced, and a reusable device, which is configured for multiple use. For such applications, the single-use device preferably comprises the pump housing 401 and the rotor 3 arranged therein as single-use parts for single use that can therefore be used only once according to their intended purpose and then have to be replaced with a new, unused part for the next application. The reusable device comprises the stator 2. For such applications with components for single use, it is a particular advantage that the assembly of the pumping device from the single-use device with the rotor 3 contained therein and the reusable device with the stator 2 can be carried out extremely easily, quickly and especially without tools.

The following plastics, for example, are preferred for the manufacture of the plastic parts of the rotor 3, such as the vanes 404, the jacket 8 and the flux barriers made of the low-permeable material N: polyethylenes (PE), polypropylenes (PP), low density polyethylenes (LDPE), ultra-low density polyethylenes (ULDPE), ethylene vinyl acetates (EVA), polyethylene terephthalates (PET), polyvinylchloride (PVC), polyvinylidene fluorides (PVDF), acrylonitrile buta diene styrenes (ABS), polyacrylics, polycarbonates (PC).

In addition to these plastics, PolyPropylene (PP), PolyUrethane (PU) and silicones are also preferred for the manufacture of the pump housing 401 or a mixing tank of a mixing device.

If the rotor 3 does not need to be treated with gamma sterilization, the materials polytetrafluoroethylene (PTFE) and perfluoroalkoxy polymers (PFA) known under the brand name Teflon are also suitable for the plastic components.

Due to the absence of mechanical bearings, the pumping device 400 is in particular suitable for such applications in which very sensitive substances are conveyed, for example blood pumps, or on which very high demands are made on purity, for example in the pharmaceutical industry or in the biotechnological industry, or with which abrasive or aggressive substances are conveyed, which would very quickly destroy mechanical bearings, for example the pumping of slurry or acidic fluids in the semiconductor industry.

What is claimed:

1. An electromagnetic rotary drive configured as a temple motor, comprising:
    a rotor, which is contactlessly magnetically drivable, configured as coil-free and free of permanent magnets, and comprising a disk-shaped magnetically effective core;
    a stator configured as a bearing and a drive stator, the rotor being contactlessly magnetically drivable about an axis of rotation relative to the stator in the operating state, and the rotor configured to be contactlessly magnetically levitated with respect to the stator, the stator having a plurality of coil cores, each coil core of the plurality of coil cores comprising a bar-shaped longitudinal limb extending from a first end in a direction in parallel with the axis of rotation up to a second end and a transverse limb disposed at the second end of the longitudinal limb and extending in a radial direction, the transverse limb perpendicular to an axial direction defined by the axis of rotation; and
    a plurality of windings configured to generate an electromagnetic rotational field, each winding of the plurality of windings surrounding one of the longitudinal limbs, such that the stator is free of permanent magnets, and that the rotor is a ferromagnetic or ferrimagnetic rotor having exactly one preferential magnetic direction extending in the radial direction, and the magnetically effective core of the rotor having a magnetic resistance in the preferential magnetic direction, the magnetic resistance being at most half as large as the magnetic resistance in a direction, and is perpendicular to the preferential magnetic direction and perpendicular to the axial direction.

2. The rotary drive according to claim 1, wherein the magnetically effective core of the rotor comprises a ferromagnetic material, and the ferromagnetic material has a volume fraction of 30% to 80% of the magnetically active core.

3. The rotary drive according to claim 1, wherein the disk-shaped magnetically effective core of the rotor has a diameter, which is greater than 2 times an axial height of the magnetically effective core.

4. The rotary drive according to claim 1, wherein the magnetically effective core of the rotor comprises a plurality of bar-shaped ferromagnetic elements extending perpendicular to the axial direction and arranged parallel and spaced apart to each other.

5. The rotary drive according to claim 4, wherein the magnetically effective core of the rotor comprises a plurality of transverse webs each traverse web of the plurality of transverse webs connecting two adjacent bar-shaped ferromagnetic elements.

6. The rotary drive according to claim 4, wherein the magnetically effective core of the rotor comprises a radially outwardly arranged ring surrounding all the bar-shaped ferromagnetic elements.

7. The rotary drive according to claim 6, wherein the ring is an electrically conducting material different from the ferromagnetic material of the magnetically effective core of the rotor.

8. The rotary drive according to claim 1, wherein the magnetically effective core portion of the rotor is formed from sheet metal from a plurality of rotor elements.

9. The rotary drive according to claim 8, wherein the rotor elements are stacked in the axial direction.

10. The rotary drive according to claim 1, wherein each coil core of the plurality of coil cores is respectively made of sheet metal from elements, the elements being stacked in a circumferential direction of the rotor.

11. The rotary drive according to claim 1, wherein each transverse limb has an end face facing the rotor and has a height in the axial direction, which is respectively larger than an axial height of the magnetically effective core of the rotor.

12. The rotary drive according to claim 1, wherein an end face of each transverse limb facing the rotor is configured in a curved manner as a segment of a circular cylinder being coaxial with the rotor, so that the rotor has a constant distance in a radial direction from the end face in a centered state when viewed over the end face.

13. The rotary drive according to claim 1, further comprising a plurality of position sensors configured to determine a the position of the rotor, each position sensor of the plurality of position sensors arranged between two adjacent coil cores.

14. A rotational device for conveying, pumping, mixing or stirring fluids, the rotational device comprising:

an electromagnetic rotary drive according to claim 1, the rotor of the rotary drive being the rotor of the rotational device.

15. The rotational device according to claim 14, wherein the rotor is a pump rotor and has a plurality of vanes configured to convey a fluid.

16. The rotational device according to claim 15, wherein the rotor has a plurality of relief channels extending respectively in the axial direction through the magnetically effective core of the rotor, and each relief channel of the plurality of relief channels is arranged such that the ferromagnetic material of the magnetically effective core of the rotor is completely free of relief channels.

17. The rotary drive according to claim 1, wherein the magnetically effective core of the rotor comprises a ferromagnetic material, and the ferromagnetic material has a volume fraction of 40% to 75% of the magnetically active core.

18. The rotary drive according to claim 1, wherein the magnetically effective core of the rotor comprises a ferromagnetic material, and the ferromagnetic material has a volume fraction of 50% to 70% of the magnetically active core.

19. The rotary drive according to claim 1, wherein the disk-shaped magnetically effective core of the rotor has a diameter which is greater than 2.4 times the an axial height of the magnetically effective core.

* * * * *